(12) United States Patent
Isobe et al.

(10) Patent No.: US 7,460,186 B2
(45) Date of Patent: Dec. 2, 2008

(54) ON-VEHICLE DISPLAY DEVICE

(75) Inventors: Takashi Isobe, Tokyo (JP); Amane Mitani, Tokyo (JP); Hiroki Akatsuka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 159 days.

(21) Appl. No.: 10/562,572

(22) PCT Filed: Apr. 21, 2005

(86) PCT No.: PCT/JP2005/007636

§ 371 (c)(1),
(2), (4) Date: Dec. 27, 2005

(87) PCT Pub. No.: WO2005/105524

PCT Pub. Date: Nov. 10, 2005

(65) Prior Publication Data

US 2006/0163899 A1    Jul. 27, 2006

(30) Foreign Application Priority Data

Apr. 28, 2004 (JP) ............... 2004-133719

(51) Int. Cl.
*H04N 5/64* (2006.01)

(52) U.S. Cl. ............... 348/837; 248/27.3; 248/224.7; 248/917; 248/919; 296/37.7

(58) Field of Classification Search ............... 248/917, 248/919, 923, 284.1, 286.1, 291.1, 222.11, 248/837, 27.3, 224.7; 296/37.7; 224/311, 224/548, 553, 924; 348/836, 837
See application file for complete search history.

(56) References Cited

U.S. PATENT DOCUMENTS

| | | | | |
|---|---|---|---|---|
| 5,020,151 A * | 5/1991 | Sampei et al. | ............... | 455/345 |
| 6,059,255 A * | 5/2000 | Rosen et al. | ............... | 292/140 |
| 6,310,767 B1 * | 10/2001 | Spear et al. | ............... | 361/681 |
| 6,412,848 B1 * | 7/2002 | Ceccanese et al. | ......... | 296/37.7 |
| 6,633,347 B2 * | 10/2003 | Kitazawa | ............... | 348/837 |
| 7,165,798 B2 * | 1/2007 | Chamberlain et al. | ...... | 296/37.1 |
| 7,201,354 B1 * | 4/2007 | Lee | ............... | 248/231.9 |

(Continued)

FOREIGN PATENT DOCUMENTS

JP          3-122482         12/1991

(Continued)

*Primary Examiner*—Amy J. Sterling
(74) *Attorney, Agent, or Firm*—Birch, Stewart, Kolasch & Birch, LLP

(57) ABSTRACT

In order to enable mounting of a cabinet having a display unit to a supporting base, axial members in the shape of a regular polygonal prism are disposed in the cabinet 1 and fitting holes into which the regular polygonal prisms can be fitted, respectively, are disposed in the supporting base. By opening and then closing, or opening and then moving the axial members, the user can fit or remove them into or from the fitting holes, respectively, so as to mount or demount the cabinet to or from the supporting base. By tilting the cabinet by an angle when fitting the axial members into the fitting holes, respectively, the user can change the rotational attitude of the cabinet with respect to the supporting base. Thereby, the user can use the display unit at different times and at different positions with simple manipulations.

7 Claims, 15 Drawing Sheets

U.S. PATENT DOCUMENTS

| | | | |
|---|---|---|---|
| 2002/0113451 A1* | 8/2002 | Chang | 296/37.7 |
| 2005/0189461 A1* | 9/2005 | Peng | 248/317 |
| 2005/0205741 A1* | 9/2005 | Chen | 248/317 |
| 2006/0109388 A1* | 5/2006 | Sanders et al. | 348/837 |

FOREIGN PATENT DOCUMENTS

| | | |
|---|---|---|
| JP | 7-23311 A | 1/1995 |
| JP | 7-156833 A | 6/1995 |
| JP | 7-309179 A | 11/1995 |
| JP | 7-329648 A | 12/1995 |
| JP | 2001-305987 A | 11/2001 |
| JP | 2004-34889 A | 2/2004 |

* cited by examiner

ON-VEHICLE DISPLAY DEVICE

FIELD OF THE INVENTION

The present invention relates to a vehicle-mounted display apparatus which facilitates the mounting and demounting of a display unit thereof to and from any one of several different positions while changing the attitude of the display unit.

BACKGROUND OF THE INVENTION

Conventionally, a display unit (or a display) for use in automobiles is typically built in an instrument panel or fixed to a cabin ceiling. Displays have been becoming multifunctional and vehicle-mounted display apparatus can offer different types of information, such as DVD reproduced information, TV programs, as well as road guidance information provided by a navigation system, using an identical display.

A display unit which is originally provided as a display of a navigation system and is built in and fixed to, for example, an instrument panel of a motor vehicle so that the display unit is suitable for visual observation from a driver's seat has an attitude which is not suitable for the visual observation of a passenger in a back seat of the motor vehicle who is watching a DVD reproduced image or a TV program, and becomes an obstacle of the driver of the motor vehicle because such an image which can interfere with the driver's concentration may go into the field of view of the driver. On the other hand, when the driver takes a reclining state when he or she is stopping the motor vehicle, he or she cannot enjoy image information displayed on the display unit since the orientation of the driver's face is different from that at the time of the operation of the motor vehicle.

In order to meet user demands to want to watch a DVD reproduced image or a TV program while he or she is lying on his or her back on a flat backseat, an additional display unit must be newly disposed on the cabin ceiling. However, since the frequency in use of such a display unit intended for backseats is generally low and the addition of a display unit intended for backseats provides an extra cost, it is rare to install an additional display unit for backseats and it is therefore difficult to provide passengers in backseats with satisfaction in most cases.

On the other hand, as a technology for changing the attitude of a display unit in a cabin, "A vehicle-mounted display including a display device and a supporting member attached to a wall surface on a side of a seat of a vehicle, for supporting the display device, wherein a guiding mechanism for guiding the display device from a standby state in which the screen of the display device is parallel to the wall surface to a display viewing state in which the display device stands from the wall surface toward the inner side of the cabin, and the screen of the display unit is oriented toward the seat is disposed between the display device and the supporting member" is disclosed (for example, refer to patent reference 1). As another technology for changing the attitude of a display unit in a cabin, "A thin display unit which is, as a storing means disposed in a vehicle seat, mounted to a disk player so that the display unit can move in parallel" is disclosed (for example, refer to patent reference 2).

However, either of the technologies disclosed by the above-mentioned patent references simply moves the display device or display unit in a small range which is allowed by the guiding mechanism so as to change the attitude of the display device or display unit, and is not intended for a large positional displacement of the display device or display unit from a fixed position within a built-in instrument panel to a position on the cabin's ceiling so as to solve the above-mentioned problem, for example. In addition, since the related art technologies do not have a technical idea of mounting and demounting a cabinet (which accommodates a display unit therein) to and from a supporting member, the related art technologies do not make it possible for the single display unit to be used at different positions.

Patent reference 1: JP,7-309179,A
Patent reference 2: JP,7-23311,A

A problem with a related art vehicle-mounted display apparatus which is so constructed as mentioned above is that while it can change the attitude of a display unit, it cannot allow users to use the display unit at different times and at different positions with a simple operation since it does not have a means for easily mounting and demounting the display unit to and from a supporting base.

The present invention is made in order to solve the above-mentioned problems, and it is therefore an object of the present invention to a vehicle-mounted display apparatus which can allow users to use the display unit at different times and at different positions with a simple operation.

DISCLOSURE OF THE INVENTION

A vehicle-mounted display apparatus in accordance with the present invention includes: an attitude setting mechanical unit for, when combining a cabinet having a display unit with a supporting base which is a member combined with the cabinet and which is secured to an arbitrary position, enabling determination of a rotational attitude of one of the cabinet and the supporting base with respect to the other one for each of a plurality of positions; a mounting and demounting mechanical unit for combining the cabinet with the supporting base so that the cabinet can be mounted to and demounted from the supporting base; and an operating mechanical unit for holding the combination of the cabinet and the supporting base, and for canceling the combination of them.

Therefore, the vehicle-mounted display apparatus makes it possible to mount and demount the display unit together with the cabinet to and from either of supporting bases arranged at different positions by using the mounting and demounting mechanical unit, to adjust the position of the display unit to an optimal visual position by using the attitude setting mechanical unit, to hold the display unit at the appropriate attitude by using the operating mechanical unit, and to cancel the combination of the cabinet and a supporting base to change the position where the cabinet is mounted. The present invention thus offers an advantage of enabling users to use the display unit at different times and at different positions with simple manipulations of the vehicle-mounted display apparatus.

PREFERRED EMBODIMENTS OF THE INVENTION

Hereafter, in order to explain this invention in greater detail, the preferred embodiments of the present invention will be described with reference to the accompanying drawings.

Embodiment 1

A vehicle-mounted display apparatus according to embodiment 1 of the present invention will be now described.

Figure 1:
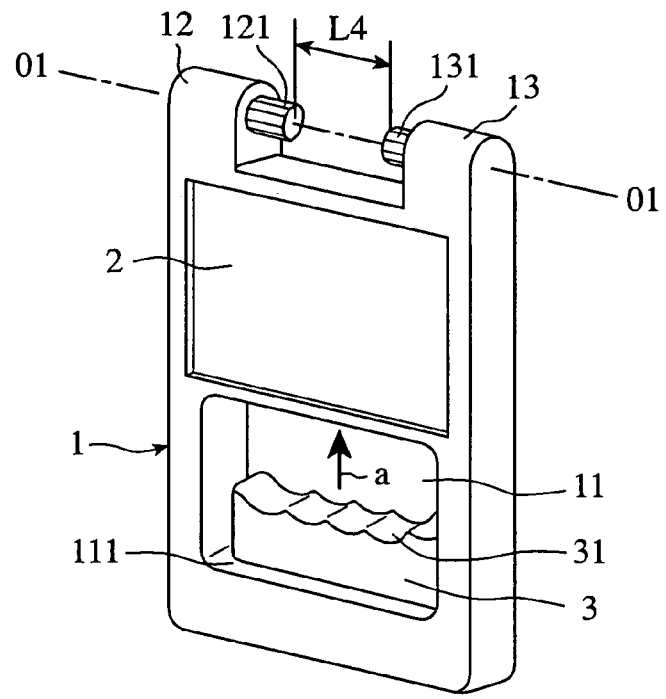
FIG. 1 is an outward appearance perspective view of a cabinet in which axial members are open.

First, a cabinet provided with a display unit will be explained. In FIG. 1, the cabinet 1 is formed of a rectangular block made of resin or metal. A rectangular penetrating opening 11 is formed in an end portion of the cabinet 1 which is formed in the shape of a rectangular block. In the cabinet 1, two corneous protruding portions 12 and 13 are disposed opposite to each other at an interval in another end portion of the cabinet which is opposite to the end portion in which the penetrating opening 11 is formed. A display unit 2 formed in the shape of a rectangular parallelepiped, which consists of a liquid crystal display panel or the like, is disposed between the two protruding portions 12 and 13 and the opening 11.

Axial members 121 and 131 which are made of metal are formed face to face in the protruding portions 12 and 13, respectively, so that the axis line of each of the axial members matches with an identical axis 01-01, and are slidably supported by the protruding portions 12 and 13, respectively, so that the axial members can move closer to each other and move away from each other along the same axis line 01-01.

The penetrating opening 11 has a rectangular shape which is large enough to contain one hand, and an operating member 3 is slidably disposed in an inner surface 111 which is the one of four inner surfaces of the penetrating opening 11 which is the farthest from the above-mentioned end portion of the cabinet in which the two protruding portions 12 and 13 are disposed. The operating member 3 can slide closer to the two protruding portions 12 and 13 as shown by an arrow a, and can slide away from the two protruding portions 12 and 13 as shown by an arrow b (see FIG. 2).

Figure 2:
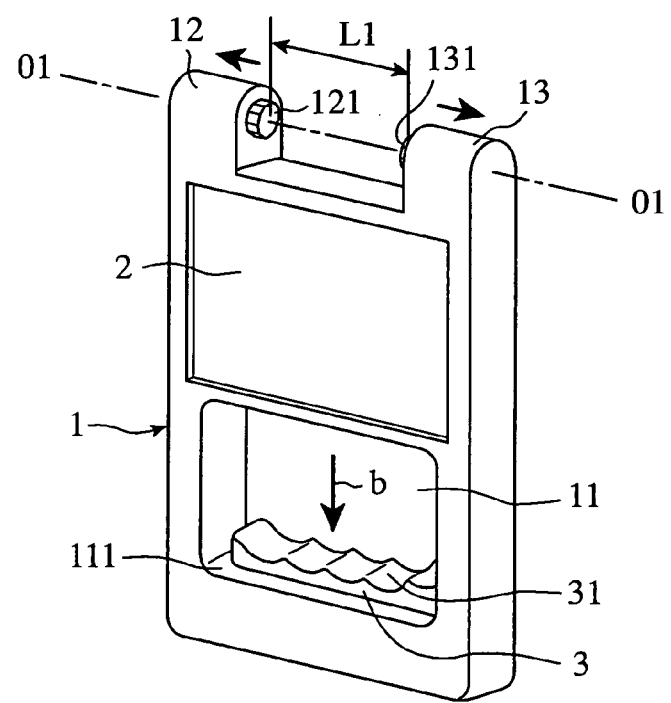
FIG. 2 is an outward appearance perspective view of the cabinet in which the axial members are closes.

The operating member 3 is pressed toward a direction of the arrow a by a pressing means (i.e., a spring 81) which will bet mentioned later. The user can push down on the operating member 3 into the cabinet 1 against the pressing force by the pressing means, as shown in FIG. 2, by touching a grip 31 formed in the shape of a wave with the user's finger to apply a pressure to it. When the user weakens the pressure to grasp the grip, the operating member 3 returns to its protruding position as shown in FIG. 1 according to the pressing force by the pressing means.

The axial members 121 and 131 are formed in the shape of a regular octagonal prism. Their shape is not necessarily limited to a regular octagonal prism, and they have only to be formed in the shape of a regular polygonal prism. The two axial members 121 and 131 are arranged on the same axis line 01-01 so that corresponding sides of the octagonal end faces of the two axial members are in alignment with each other, and can be made to reciprocate in mutually opposite directions and in synchronization with two-way movements of the operating member 3. In accordance with this embodiment 1, as a means for causing the two axial members to reciprocate in mutually opposite directions and in synchronization with two-way movements of the operating member, there is provided a pressing means for pressing the axial members 121 and 131 toward the interior of the cabinet 1, i.e., toward directions along which the axial members 121 and 131 move closer to each other, a stopper for restricting movements of the axial members 121 and 131 which are caused by the pressing means, and a movement transferring means for transferring a movement of the operating member 3 to the axial member 121 and 131.

Figure 3:
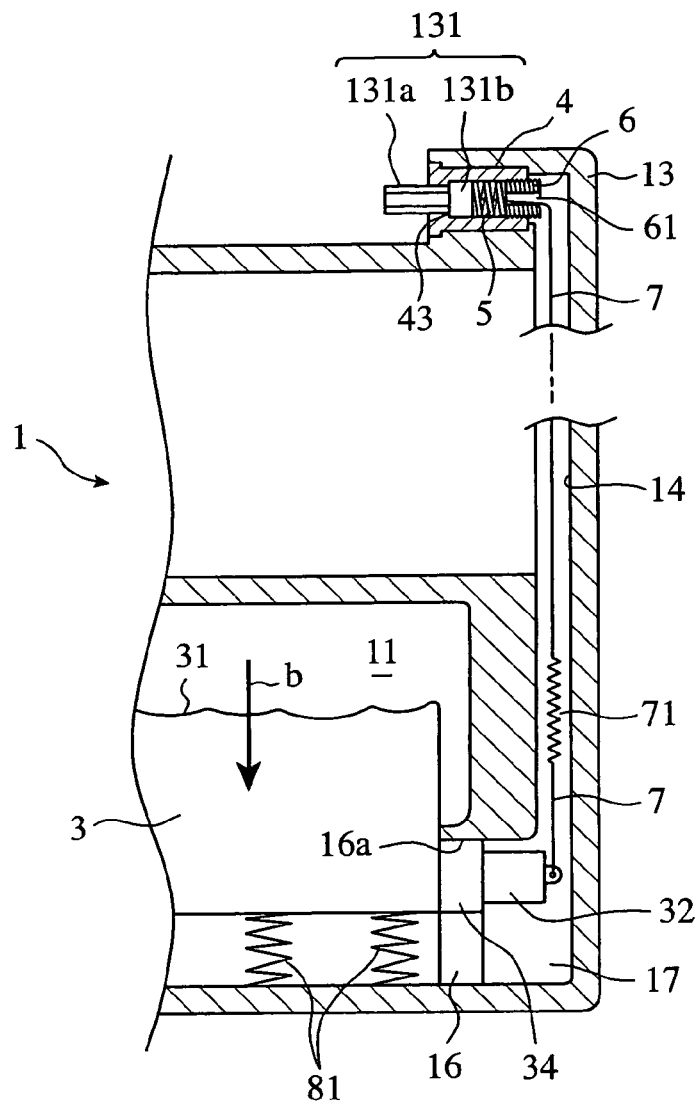
FIG. 3 is a cross-sectional view of the cabinet, for explaining an operation means for causing each of the axial members to reciprocate.
Figure 4:
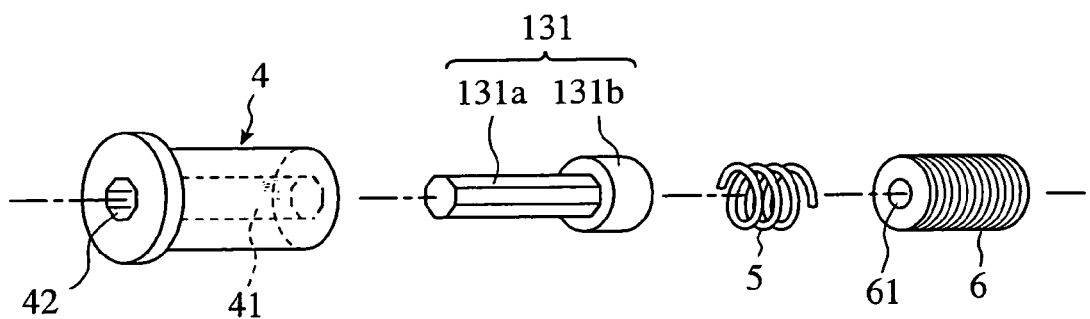
FIG. 4 is an exploded perspective view for explaining a pressing means used for each of the axial members.

With reference to FIGS. 3 to 6, the structures of the movement transferring means and other components will be explained. The structure of peripheral components for the axial member 121 and that of peripheral components for the axial member 131 are bilateral symmetric, and these structures can be assumed to be the same. Therefore, only the structure of peripheral components for the axial member 131 will be explained hereafter. The axial member 131 has an axis portion 131a which is formed in the shape of a regular octagonal prism, and a sliding portion 131b which is integrally formed with this axis portion 131a and in the shape of a cylinder, as shown in FIGS. 3 and 4.

A cylindrical sleeve 4 for holding the axial member 131 therein has a large diameter hole 41 and a small diameter hole 42 which are formed therein. The sliding portion 131b is slidably engaged with the large diameter hole 41, and the axis portion 131a is inserted into and fitted into the small diameter hole 42 which is formed in the shape of a regular octagonal prism and at a left end portion of the sleeve 4. An extensible spring 5 is disposed in the large diameter hole 41 so as to press the slide portion 131b, and a spring receiving member 6 is screwed into a right end portion of the large diameter hole 41, so that the spring 5 produces a pressing force for pressing the axial member 131.

As shown in FIG. 3, the axial member 131 is pressed toward the direction of the interior of the cabinet 1 (i.e., a leftward direction in the figure) by the elasticity of the spring 5 which is the pressing means. The protrusion of the axial member 131 from the sleeve 4 resulting from the movement of the axial member 131 by the pressing is restricted by collision of the sliding portion 131b with a level difference portion 43 which is formed by the difference between the diameter of the small diameter hole 42 and that of the large diameter hole 41. Therefore, this level difference portion 43 serves as a stopper for restricting movements of the axial member 131.

A penetrating hole 61 is formed in the spring receiving member 6 so that it is running along a central axis of the spring receiving member 6. An end part of a wire rod 7 is fixed to the sliding portion 131b. The penetrating hole 61 has an exit part located at a right end thereof, from which the wire rod 7 exits, the exit part having a smooth curved edge which is rounded in order to reduce the sliding resistance with the wire rod 7. The wire rod 7 passes through the center of a space portion which is located along the axis of the spring 5 which is wound in the form of a coil, further passes through the penetrating hole 61 and above-mentioned curved edge of the exit part, is bent by 90 degrees toward a downward direction shown in FIG. 3, passes through a tunnel-shaped through hole 14 which is formed in the cabinet 1, and is fixed to an arm 32 which is integrally formed with the operating member 3.

Figure 5:
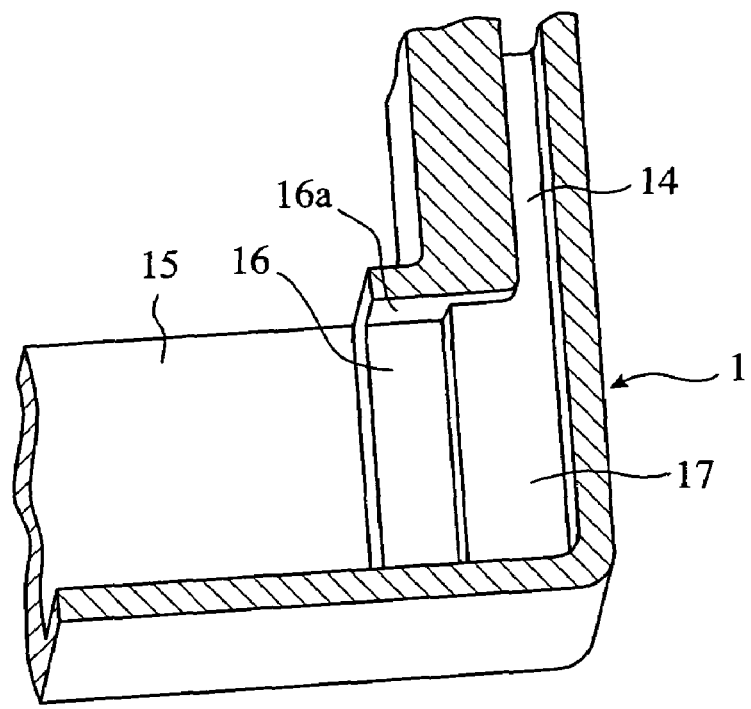
FIG. 5 is a partial cross-sectional perspective view of the cabinet.
Figure 6:
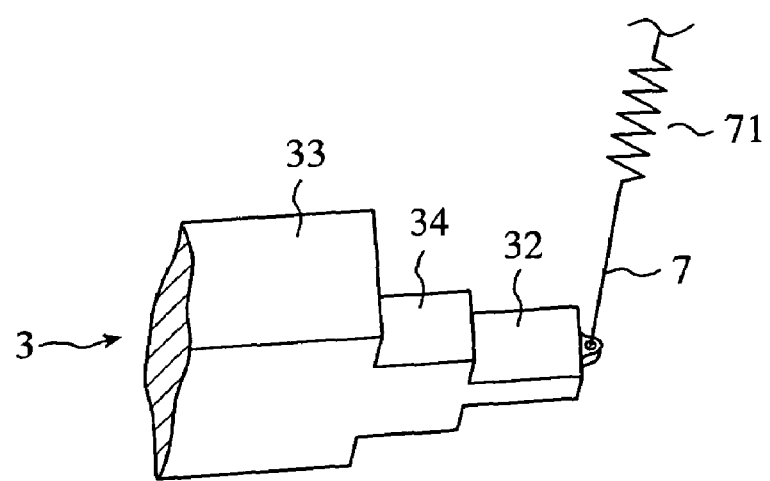
FIG. 6 is a partial cross-section perspective view of an operating member.

As shown in FIG. 6, the operating member 3 has a portion which is protruding rightward (i.e., outward) from a main body 33 thereof and which is formed so as to decrease in thickness in two steps, and the above-mentioned portion includes a side piece 34 and the arm 32, which are listed in order of increasing distance from the main body 33. As shown in FIGS. 3, 5, and 6, the rectangular-parallelepiped-shaped main body 33 is slidably fitted into a sliding hole 15 for the main body, which is formed in the center portion of the cabinet 1, and the side piece 34 is slidably fitted into the sliding hole 16. The arm 32 is reciprocatably located in an arm gap 17 which is communicating with the through hole 14.

The arm 32 is so disposed as to reciprocate in the arm gap 17 without coming into contact with anything within the cabinet 1 in order to reduce the sliding resistance. The wire rod 7 extending from the spring receiving member 6 to the arm 32 has a tautness spring 71, as an elastic member for absorbing the looseness of the wire rod, in the middle thereof. As shown in FIG. 3, extensible springs 81 are placed between the operating member 3 and the cabinet 1 in order to enhance returning movements of the operating member 3. The contact of the top end of the side piece 34 with a wall surface 16a formed at an end of the sliding hole 16 restricts movements of the operating member 3 which are caused by the elasticity of the springs 81, spring 5, spring 71, etc.

The arm 32, wire rod 7, spring 71, etc. constitute the movement transferring means for transferring a movement of the operating member 3 to the axial member 131. In FIG. 3, when the operating member 3 is pushed down, the arm 32 pulls the wire rod 7 downward and therefore the axial member 131 moves rightward against the elasticity of the spring 5. Although not illustrated in the figure, the axial member 121 moves leftward in a direction opposite to that in which the axial member 131 moves. That is, when the user touches the grip 31 of the operating member 3 with the user's finger to push down on the grip, the axial members 121 and 131 open outwardly towards outside the cabinet 1.

When the user releases the pressure applied to the grip 31, the operating member 3 returns to its original position because of the elasticity of the springs 81. As a result, the axial member 131 moves leftward according to the pressing force of the spring 5, while the axial member 121 moves rightward according to the pressing force of the spring thereof. Thus, these axial members 121 and 131 close inwardly towards inside the cabinet 1.

Although the side piece 34 increases the strength of the arm 32 and functions as a stopper, the side piece 34 can be omitted if the strength of the arm 32 is fully increased without using the side piece 34. In this case, the arm 32 can be so constructed as to protrude directly from the main body 33, and the arm 32 can have a stopper mechanism for coming into contact with the wall surface 16a.

Figure 7:
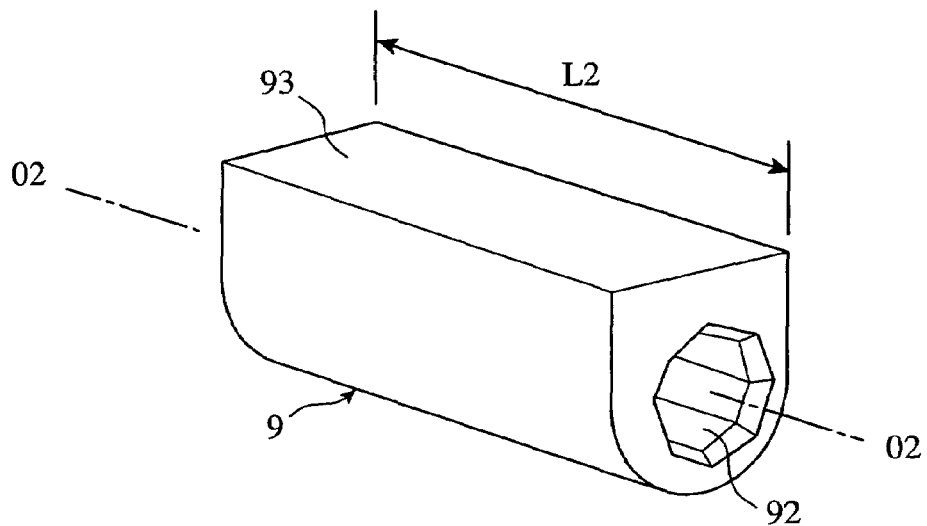
FIG. 7 is a perspective view of a supporting base.
Figure 8:
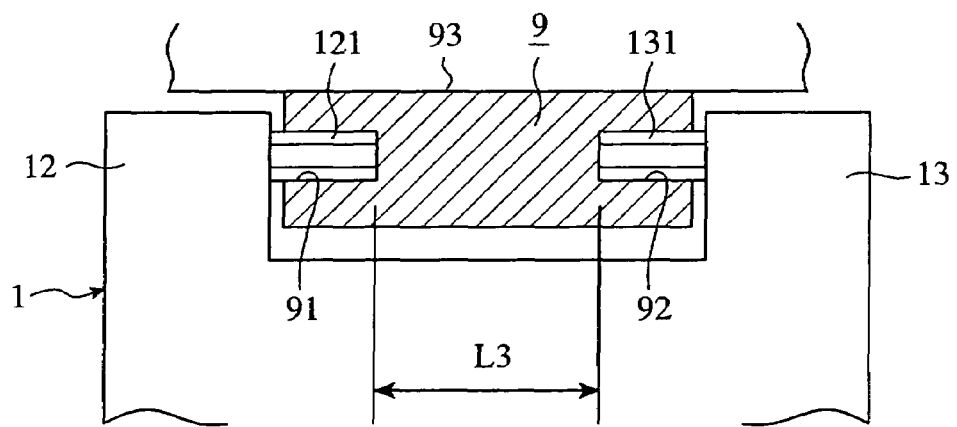
FIG. 8 is a partially sectional view for explaining a state of a combination of the supporting base and the cabinet.

Next, the supporting base 9 which can be combined with the cabinet 1 will be explained. In FIGS. 7 and 8, the supporting base 9 is made of resin or metal, and is formed in the shape of a thin long block. The supporting base 9 has fitting holes 91 and 92 whose axis lines are aligned with an axis line 02-02 thereof, and the fitting holes 91 and 92 are each shaped like a regular octagonal prism so that they can be engaged with the axial members 121 and 131, respectively, and corresponding sides of the ends of the two regular-octagonal-prism-shaped fitting holes are in alignment with each other. The upper surface of the supporting base 9 serves as a mounting face 93. This mounting face 93 is put onto a position where the supporting base is to be mounted, and is fixed to the position using a proper means, such as clamping with screws or adhesion.

Next, the operation of the vehicle-mounted display apparatus in accordance with this embodiment of the present invention will be explained.

The user can grasp the operating member 3 with one hand from a lower end of the cabinet 1 shown in FIG. 1, and can carry the cabinet to the supporting base 9 which is fixed in advance to a proper position. When the user then pushes down on the operating member 3, the axial members 121 and 131 open outwardly as shown in FIG. 2. In this state where the axial members 121 and 131 are open, the interval L1 between the axial members 121 and 131 is set to be longer than the length L2 of the supporting base 93 shown in FIG. 7.

When the user then moves the cabinet 1 with this state in which the axial members 121 and 131 are open being held so that they are opposite to the fitting holes 91 and 92, respectively, and loosens the grip on the operating member 3 after making sure that the display unit 2 of the cabinet 1 has a desired rotational attitude, the axial members 121 and 131 are guided into the fitting holes 91 and 92, respectively, so that the axis portions of the regular octagonal prisms can be fitted into the regular-octagonal-prism-shaped holes, respectively, as the axial members 121 and 131 close inwardly, because the end portions of the axial members 121 and 131 are beveled. Then, a fitting state is finally provided. In this way, the rotational attitude of the cabinet 1 around the fitting portions thereof with respect to the supporting base 93 is nearly determined by the attitude of the cabinet 1 which was just prior to the time when it is fitted into the supporting base.

The axial members 121 and 131 which have advanced into the fitting holes 91 and 92, respectively, come into contact with the bottoms of the fitting holes 91 and 92, respectively, and then stop. As a result, the axial members 121 and 131 sandwich the supporting base 9 and the fitting state is then held. To this end, the interval L3 between the bottoms of the fitting holes 91 and 92 shown in FIG. 8 in a direction of their depths (i.e., the direction in which the axial members open or close) is set to be longer than a minimum interval L4 between the axial members 121 and 131 shown in FIG. 1 in the direction in which the axial members close.

When desiring to change the rotational attitude of the cabinet 1 (i.e., the display unit 2) after mounting the cabinet 1 to the supporting base 9, the user has only to manipulate the operating member 3 to open the axial members 121 and 131 and temporarily remove them from the fitting holes 91 and 92, respectively, to tilt the regular-octagonal-prism-shaped axial members 121 and 131 by a desired number of angular steps with respect to the fitting holes 91 and 92 so as to tilt the cabinet by a desired angle, and to fit the axial members 121 and 131 into the fitting holes 91 and 92 again, respectively.

Since the fitting portions of this example are formed in the shape of a regular octagonal prism, the rotational attitude of the display unit 2 can be adjusted in angular steps of 45 degrees. The fitting portions can be formed in the shape of an arbitrary regular polygonal prism. As the number of lateral side surfaces of each of the two regular-polygonal-prism-shaped axial members increases, the rotational attitude of the display unit can be adjusted in steps of a smaller angle.

Examples of arrangement of supporting bases and mounting of one or more cabinets to one or more supporting bases will be explained.

Figure 9:
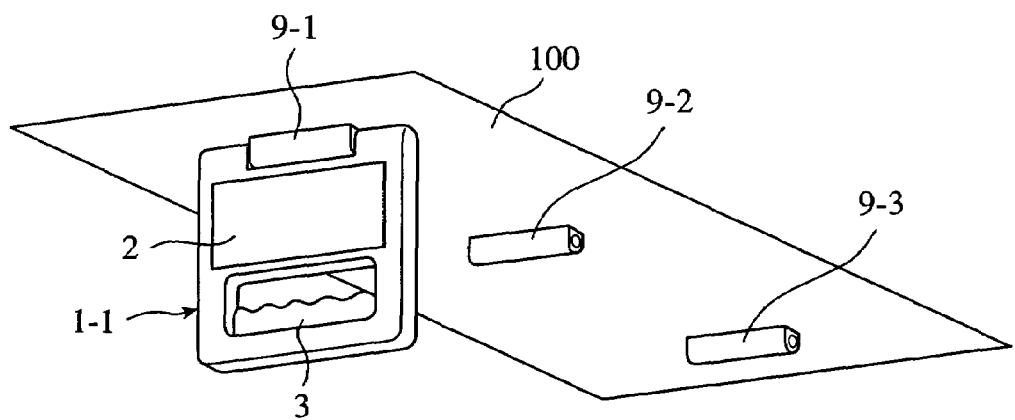
FIG. 9 is a perspective view for explaining an example of attachment of the cabinet and the supporting base to a ceiling.
Figure 10:
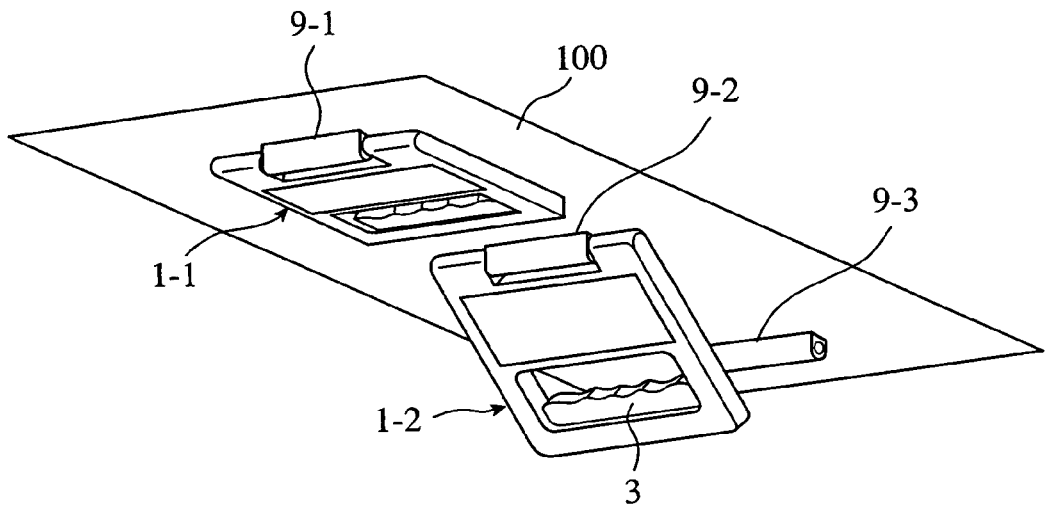
FIG. 10 is a perspective view for explaining another example of attachment of the cabinet and the supporting base to the ceiling.
Figure 11:
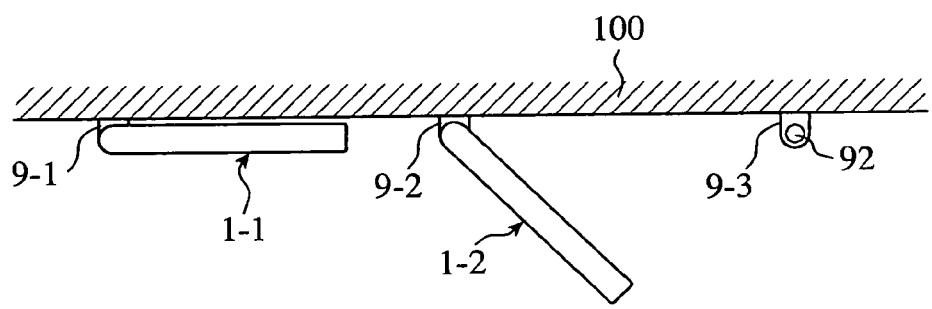
FIG. 11 is a perspective view for explaining another example of attachment of the cabinet and the supporting base to the ceiling.

FIGS. 9, 10, and 11 each show an example in which a plurality of supporting bases, in this example three supporting bases 9-1, 9-2, and 9-3 are arranged on the ceiling 100 of the cabin of the motor vehicle so that they are aligned in a direction of three rows of seats and correspond to the positions of the three rows, respectively. A case, as shown in FIG. 9, where a cabinet 1 of this embodiment is mounted to the supporting base 9-1 is suitable for visual observation of the display unit 2 of the cabinet by passengers on seats of the first row. In contrast, a case where the cabinet 1 is mounted to the supporting base 9-2 or 9-3 is suitable for visual observation of the display unit 2 of the cabinet by passengers on seats of the second or third row. Therefore, the single cabinet 1 (i.e., the display unit 2) can be ordered around at different times and at different positions.

As shown in FIGS. 10 and 11, when a cabinet 1-1 of this embodiment is mounted to the supporting base 9-1 with the screen of the display unit of the cabinet being in parallel with the ceiling 100, passengers can watch a DVD reproduced image or a TV program while laying on their backs after making their seats be fully flat when the motor vehicle is held in a stop state. When another cabinet 1-2 of this embodiment is mounted to the supporting base 9-2 independently of the cabinet 1-1 with the screen of the display unit of the other cabinet being at a certain angle with respect to the ceiling 100, two or more passengers can see different images simultaneously in such a way that a passenger who is laying on his or her back can watch the display unit of the cabinet 9-1 and another passenger who is getting up can watch the display unit of the cabinet 9-2. As this time, they can hear sounds using their headphones individually.

Figure 12:
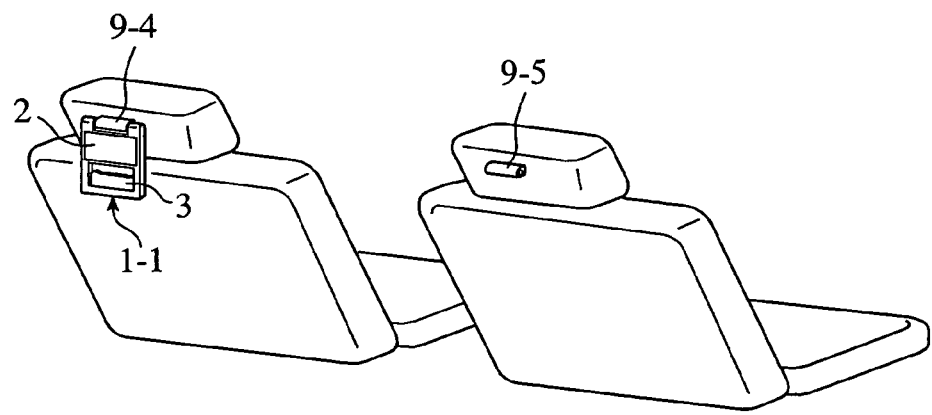
FIG. 12 is a perspective view for explaining an example of attachment of the cabinet and the supporting base to a seat.

Another example shown in FIG. 12 is a case where supporting bases 9-4 and 9-5 are fixed to the headrests of two seats, respectively. In this example, only one passenger who is sitting on a back seat (not shown) which is located in the back of one of the two seats shown is allowed to adjust the rotational attitude of the cabinet 1-1 freely so that he or she can view the display unit 2 with his or her favorite easier attitude.

In the vehicle-mounted display apparatus in accordance with above-mentioned embodiment 1 including the cabinet 1 provided with the display unit 2, and the supporting base 9 which is a member, which can be combined with this cabinet 1 and which is secured to a vehicle body, a convex portion with rotational symmetry (i.e., a number of angular convex parts each having a peak which is one ridge of a regular octagonal prism) is formed in each of the axial members 121 and 131 disposed in the cabinet 1, and a concave portion with rotational symmetry (i.e., a number of V-shaped concave parts each having a valley which is one ridge of a hollow shaped like a regular octagonal prism) is formed in the inner surface of each of the fitting holes 91 and 92 of the supporting base 9 into which the axial members 121 and 131 can be fitted, respectively, as an attitude setting mechanical unit for, when combining the cabinet 1 and the supporting base 9, determining the rotational attitude of one of them with respect to the other one for each of a plurality of positions.

In accordance with this structure, when the cabinet 1 is combined with the supporting base 9, the fitting of the axial members 121 and 131 into the fitting holes 91 and 92 can cause the above-mentioned angular convex parts of each of the axial members to be engaged with the above-mentioned V-shaped concave parts of a corresponding one of the fitting holes, respectively, thereby determining the rotational attitude of the cabinet 1 with respect to the supporting base 9. Since the eight angular convex parts of each of the regular-octagonal-prism-shaped axial members and the eight V-shaped convex parts of each of the regular-octagonal-prism-shaped fitting holes are 8-fold rotational symmetric, the rotational attitude of the cabinet can be determined for each of two or more positions. The shapes of the axial members and fitting holes are not limited to a regular octagonal prism, and they can be formed in the shape of a regular polygonal prism. Instead of the axial members and fitting holes in the shape of a regular polygonal prism, a combination of axial members each having a convex portion with rotational symmetry and fitting holes each having a concave portion with rotational symmetry can be used.

The vehicle-mounted display apparatus has a mounting and demounting mechanical unit for combining the cabinet 1 and the supporting base 9 so that the cabinet 1 can be mounted to and demounted from the supporting base 9. This mounting and demounting mechanical unit includes the axial members 121 and 131 disposed in the cabinet 1, and the fitting holes 91 and 92 disposed in the supporting base 9, into which the axial members 121 and 131 can be fitted, respectively. Using the mounting and demounting mechanical unit which utilizes the fitting relationship between the axial members and the fitting holes, the cabinet 1 can be simply combined with an arbitrary one of two or more supporting bases disposed at different positions, and the combination of the cabinet 1 with one of the two or more supporting bases can be cancelled to change the position of the cabinet. Since each of the axial members 121 and 131 and fitting holes 91 and 92 has the mounting and demounting mechanical unit and attitude setting mechanical unit, the structure of the vehicle-mounted display apparatus can be simplified.

Since the vehicle-mounted display apparatus has an operating mechanical unit fore holding the combination of the cabinet 1 and the supporting base 1, and for canceling the combination of them, the cabinet 1 can be integrally combined with the supporting base 9 and the combination of them can be released. As a result, even when a vehicle including the vehicle-mounted display apparatus runs and vibrates, the combination of the cabinet 1 and the supporting base 9 (i.e., the attitude of the cabinet) is maintained so that passengers in the vehicle can watch an image displayed on the display unit 2 with stability.

This operating mechanical unit is constructed as an operating means for causing the axial members 121 and 131 to reciprocate. The operating means is provided with the pressing means (i.e., the spring 5) for pressing each of the axial members 121 and 131 (i.e., the regular polygonal prisms) toward inside the cabinet 1, the stopper (i.e., the level difference portion 43) for restricting movements of each of the regular polygonal prisms which are caused by the pressing means, and the wire rod 7, arm 32, spring 71, etc. which are provided as the movement transferring means for transferring a movement of the operating member 3 to the axial members 121 and 131.

Since this operating means has a mechanism for closing the axial members 121 and 131 by using the pressing force of the spring 5 which is the pressing means, the axial members 121 and 131 sandwich the cabinet 1 by using this closing mechanism with themselves being within the fitting holes 91 and 92, respectively, and holds this state with stability. Thereby, both the above-mentioned mounting and demounting mechanical unit and the above-mentioned attitude setting mechanical unit are held in a state where they are locked. This operating means can open the axial members 121 and 131 outwardly in response to the user's manipulation of the operating member 3 so as to cancel the above-mentioned sandwiching. Therefore, the user can easily cancel the combination of the cabinet 1 and the supporting base 9 only by manipulating the operating member 3 so as to mount the cabinet 1 to another supporting base at a different position.

Embodiment 1 has been explained focusing on the example in which the axial members 121 and 131 and the operating means are disposed in the cabinet 1, and the fitting holes 91 and 92 are formed in the supporting base 9. Since two or more supporting bases 9 of this embodiment can be disposed at two or more desired positions, it is desirable that each of them has a compact structure which does not take up space at the time of non-use. To this end, each supporting base 9 of this embodiment is so constructed as to have only the fitting holes 91 and 92.

In contrast to this structure, fitting holes can be formed in the cabinet 1, and axial members and an operating means can be disposed in each supporting base 9. In this case, since only the display unit 2 and the fitting holes are disposed in the cabinet 1, the structure of the cabinet 1 is simplified.

Embodiment 2

A vehicle-mounted display apparatus according to embodiment 2 of the present invention will be now described.

Figure 13:
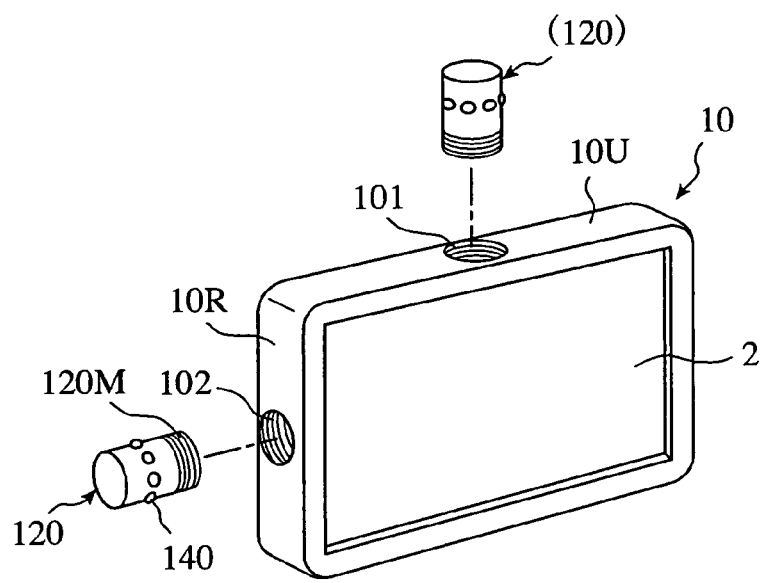
FIG. 13 is a perspective view of a cabinet and an axial member.

First, a cabinet will be explained. As shown in FIG. 13, the cabinet 10 is made of resin or metal and is formed in the shape of a rectangular parallelepiped, and is equipped with a display unit 2 in the shape of a rectangular parallelepiped, which consists of a liquid crystal display panel or the like. An attaching member 101 which consists of a female screw hole is formed in an upper side 10U of the cabinet 10 which is located above the display unit 2. Similarly, another attaching member 102 which consists of a female screw hole is formed in a left side 10R of the cabinet 10.

Figure 14:
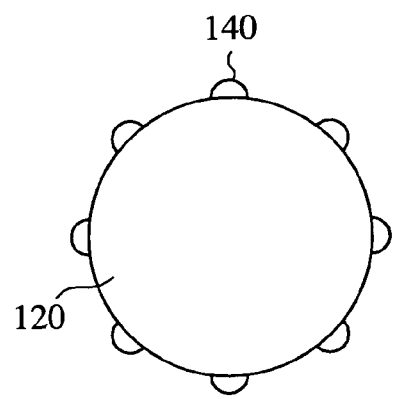
FIG. 14 is a front view of the axial member when viewed from an end of the axial member.
Figure 15:
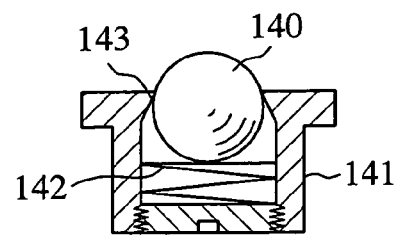
FIG. 15 is a partially sectional view for explaining a convex portion and a mechanism for supporting it.

A male screw 120M of an axial member 120 which is formed in the shape of a circular cylinder can be screwed in and fixed to either of the attaching members 101 and 102. As shown in FIG. 14 of the axial member 120 which is viewed from an end of the axial member 120, a plurality of convex portions 140 are disposed in the outer surface of the axial member 120 so that they are rotational symmetric. Each of these convex portions 140 consists of a metal sphere. As shown in FIG. 15, each of the convex portions 140 is accommodated in a container 141 integrally formed and made of resin, and is pressed toward a direction from a lower portion of the container 141 to an upper portion of the container 141 by a pressing force of an extensible spring 142 which is disposed as an elastic member. The container 141 has a hole having a smaller diameter than the convex portion 140 and formed in the upper portion thereof in order to restrict movements of the convex portion 140 caused by the pressing force of the extensible spring. An edge of this hole constitutes a stopping member 143, and a part of the spherical surface of the convex portion 140 protrudes from the hole to such an extent that the convex portion 140 does not drop out of the hole.

Figure 16:
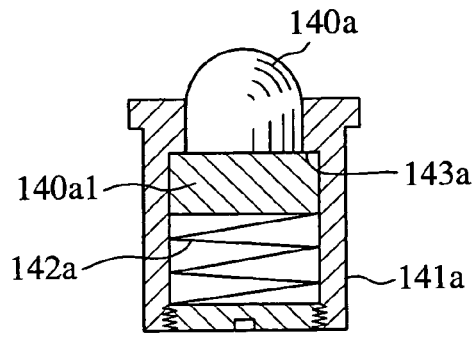
FIG. 16 is a partially sectional view for explaining a convex portion and a mechanism for supporting it.

As an alternative, as shown in FIG. 16, the axial member includes a plurality of convex portions 140a each of which is a spherical object having a step, and each of which is accommodated in a container 141a and is pressed upwardly by an extensible spring 142a within the container 141a. In this case, a stepped part formed in an upper portion of the container 141a constitutes a stopping member 143a which restricts movements of the convex portion 140a caused by the spring 142a. A large-diameter portion 140a1 which is a part of the convex portion 140a is slidably fitted into an inner diameter portion of the container 141a so as to reciprocate within the container while being guided by this inner diameter portion.

An amount of protrusion of the convex portion 140a from the container 141a can be varied by changing the shape of the convex portion 140a, unlike the convex portion which consists of a solid sphere in the example shown in FIG. 15. Each of the combination of the container 141, spring 142, and above-mentioned stopping member and the combination of the container 141a, spring 142a, and above-mentioned stopping member constitutes a pressing and holding means for pressing and holding the convex portion 140 or 140a in a state in which it is protruding from the outer surface of the axial member 120, and for holding the convex portion 140 or 140a so that it can move toward the inner side of the axial member 120.

Figure 17:
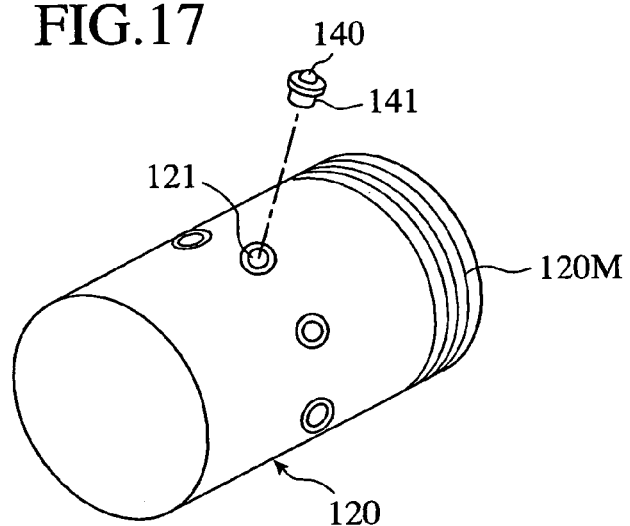
FIG. 17 is an exploded perspective view of the axial member and the convex portion.
Figure 18:
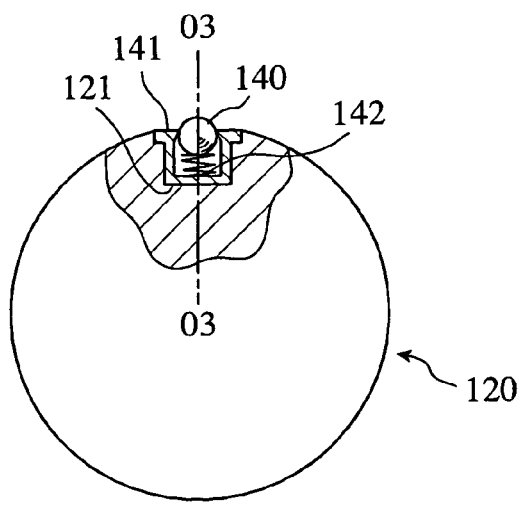
FIG. 18 is a partially sectional view of the axial member when viewed from an end of the axial member.

The axial member 120 will be explained by taking the convex portion 140 shown in FIG. 15 as an example. As shown in FIG. 17, the plurality of convex portions 140 each of which is accommodated in the container 141 are attached to attaching holes 121 formed in the circumference surface of the axial member 120 at regular intervals. One of the plurality of convex portions 140 attached to the axial member is shown in FIG. 18. As shown in this figure, an axis line 03-03 of each attaching hole 121 is aligned with a direction of the normal to the circumference surface of the axial member 120. When the convex portion 140 is pushed by a larger external force than the elastic force of the spring 142, the convex portion retracts toward the interior of the container 141. In contrast, when this external force becomes weaker, the convex portion moves toward outside the container 141 because of the elastic force of the spring 142, and then protrudes from the circumference surface of the axial member (i.e., returns to its original position). In accordance with this embodiment 2, eight convex portions 140 are disposed in the circumference surface of the axial member 120 at regular intervals so that they are rotational symmetric.

Figure 19:
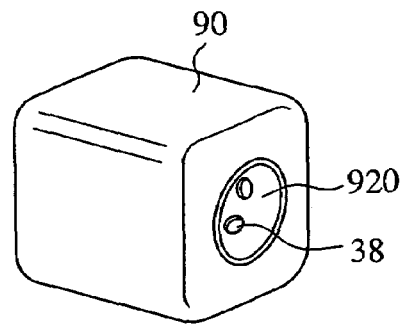
FIG. 19 is a perspective view of a supporting base.
Figure 20:
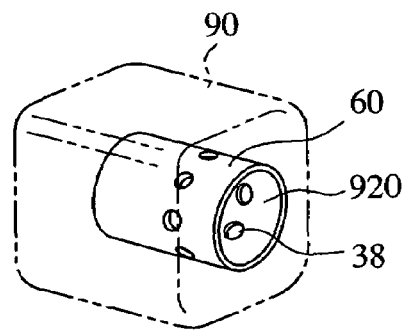
FIG. 20 is a perspective view showing a cylinder included in the supporting base.
Figure 21:
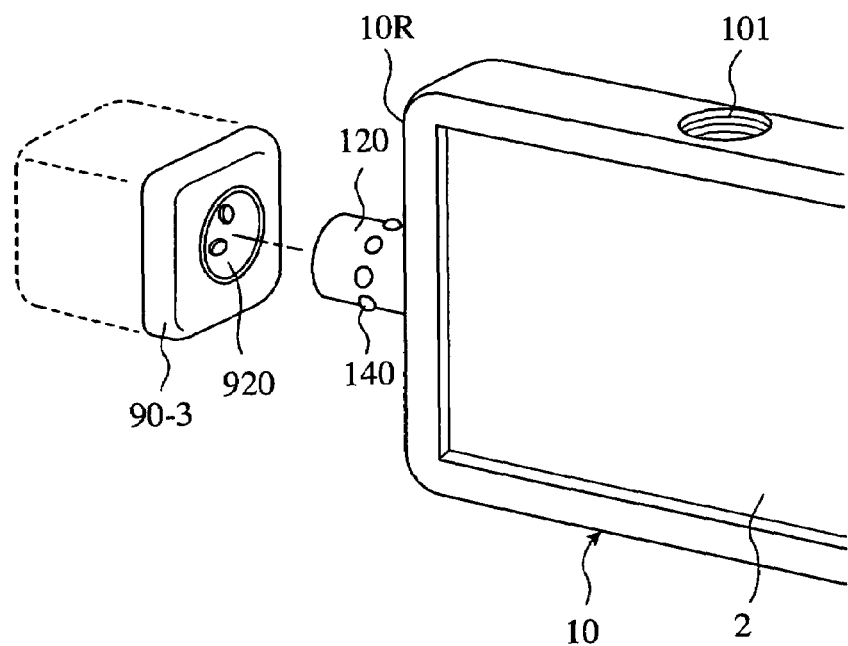
FIG. 21 is a perspective view for explaining a process of mounting a cabinet to the supporting base.

Next, the supporting base 90 will be explained with reference to FIG. 19. The supporting base 90 is a bock which is formed in the shape of a quadrangular prism, and a fitting hole 920 into which the axial member 120 can be fitted is formed in the supporting base so as to penetrate through the supporting base between two opposing surfaces. Eight concave portions 38 with which the eight convex portions 140 of the axial member can be engaged, respectively, are formed in the inner surface of the fitting hole 920 of the supporting base so that the concave portions are 8-fold rotational symmetric. As shown in FIG. 20, the fitting hole 920 is formed as an inner diameter hollow of a cylinder 60, and this cylinder 60 is embedded into the supporting base 90. For simplicity's sake, FIG. 21 shows the cylinder 60 which is actually, integrally formed with the supporting base 90, and which does not appear from outside the cylinder. The supporting base 90 has a mounting member which makes it possible to mount the supporting base itself to an arbitrary position of a motor vehicle. A plurality of supporting bases having the same structure can be fixed to a plurality of positions in the cabin of a motor vehicle.

Figure 22:
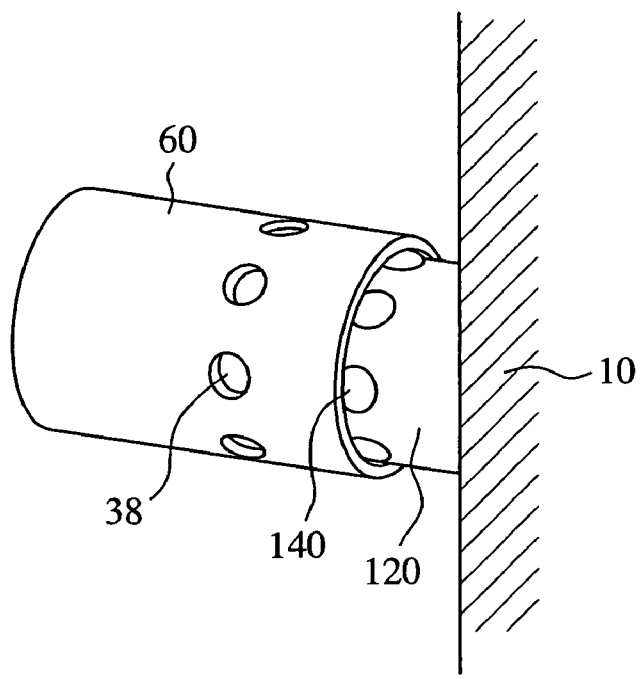
FIG. 22 is a perspective view explaining a process of fitting the axial member into the cylinder.
Figure 23:
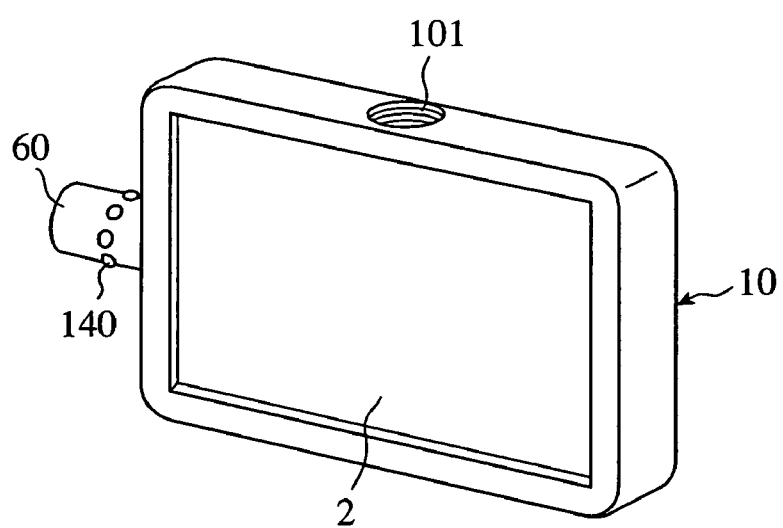
FIG. 23 is a perspective view for explaining a state where the mounting of the axial member to the cylinder is completed.

Next, mounting of the cabinet 10 to a supporting base 90 will be explained with reference to FIGS. 21 to 23. Since a plurality of supporting bases 90 having the same structure can be disposed within a motor vehicle, they are designated by reference numerals 90-1, 90-2, . . . in order to distinguish them. In order to mount the cabinet 10 to one supporting base 90, the user needs to have the cabinet 10 in his or her hand, move the axial member 120 to a position close to the fitting hole 920 of the supporting base 90, and insert the axial member 120 into the fitting hole 920 while making the axis line of the axial member 120 match with that of the fitting hole 920, as shown in FIG. 21. A state in which the axial member 120 is being inserted into the fitting hole 920 is shown in FIG. 22. FIG. 22 shows that the axial member 120 is inserted into the fitting hole 920 to such an extent that the plurality of convex portions 140 are brought into contact with an end of the cylinder 60.

As the axial member 120 is further inserted into the back of the cylinder 60 from the state shown in FIG. 22, each of the plurality of convex portions 140 is pressed inwardly by the end of the cylinder 60 and are pushed against the force of the spring 142 and is moved toward the inner side of the axial member 120. As a result, the plurality of convex portions 140 are retracted up to the same level as the inner surface of the fitting hole 920. A stopper which is not shown in the figure is disposed within the cylinder 60 along a direction of the depth of the cylinder 60, and restricts further insertion of the axial member 120 into the fitting hole 920. When the axial member 120 reaches a depth at which the plurality of convex portions 140 are placed at the same depth as the plurality of concave portions 38, respectively, the stopper comes into contact with the front end of the axial member 120 and stops further insertion of the axial member 120 into the fitting hole.

When the user then rotates the axial member 120 in a normal or reverse direction while the axial member is placed in this stop state, the plurality of convex portions 140 can be engaged with the plurality of concave portions 38 because of the pressing forces of the springs 142 while the plurality of convex portions 140 are placed at the same depth as the plurality of concave portions 38. FIG. 23 shows this engagement state. The eight convex portions 140 are arranged at regular intervals of one-eighth of the circumference of the axial member so as to be 8-fold rotational symmetric, and the eight concave portions 38 are arranged at regular intervals of one-eighth of the inner surface of the fitting hole so as to be 8-fold rotational symmetric. When the cabinet is mounted at a rotational attitude which the user does not desire, the user can change the engagement of the plurality of convex portions 140 with the plurality of concave portions 38 in steps of 45 degrees so as to hold the display unit 2 at a desired rotational attitude by twisting and rotating the cabinet 10. The user can thus adjust the rotational attitude of the display unit 2 to a desired one.

In accordance with above-mentioned embodiment 1, in order to change the rotational attitude of the cabinet 1 (i.e., the display unit 2), the user needs to hold the operating member 3 so as to open the axial members 121 and 131 outwardly, and to set the rotational position of the cabinet 1 to a desired one and then fit the cabinet into the supporting base again. In contrast, since the vehicle-mounted display apparatus in accordance with this embodiment 2 includes a kind of click mechanism which employs the combination of the plurality of convex portions 140 and the plurality of concave portions 38, the user can change the rotational attitude of the display unit 2 easily without removing the axial member 120 from the fitting hole 920 by twisting and rotating the axial member 120 together with the cabinet 1.

Figure 24:
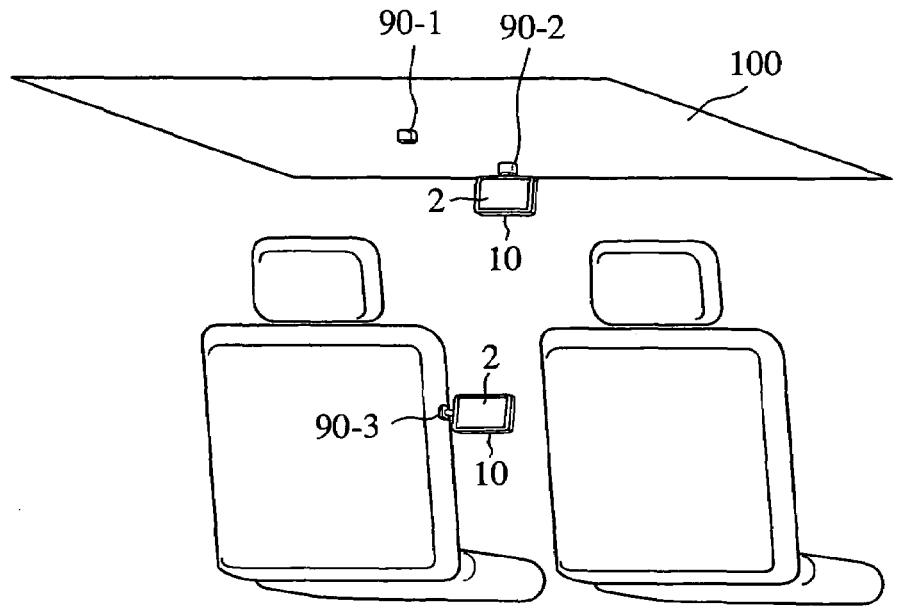
FIG. 24 is a perspective view showing an example of mounting of cabinets to supporting bases disposed on a ceiling and a sheet.
Figure 25:
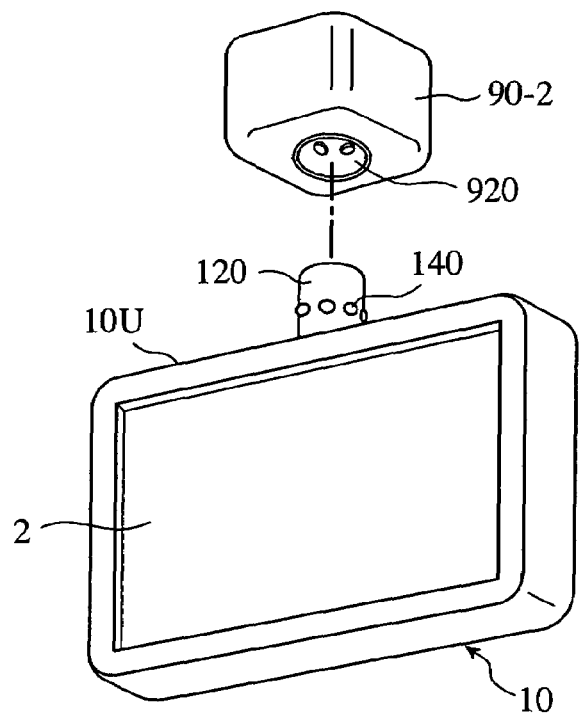
FIG. 25 is a perspective view showing an example of mounting of a cabinet to a supporting base disposed on the ceiling.

The vehicle-mounted display apparatus in accordance with embodiment 2 can meet passenger requirements by disposing a plurality of supporting bases 90 at different positions. As shown in FIG. 24, a plurality of supporting bases 90 are disposed in the vehicle in such a manner that supporting bases 90-1 and 90-2 are disposed on the ceiling 100 and a supporting base 90-3 is disposed on a side of a seat. When a supporting base is disposed on the ceiling 100, the axial member 120 is attached to an upper side 10U of the cabinet in advance by taking an example from the case shown in FIG. 13, as shown in an expanded figure of FIG. 25. When a supporting base is disposed on a side of a seat, the axial member 120 is attached to a left side 10R (or a right side) of the cabinet in advance, as shown in the expanded figure of FIG. 21.

When the single cabinet 10 is mounted in turn to the supporting bases 90-2 and 90-3 at different times and is used, different passengers can enjoy images displayed on the display unit of the cabinet at different times. In contrast, when two cabinets are provided, and one of them is mounted to the supporting base 90-2 and the other cabinet is mounted to the supporting base 90-3, different passengers can enjoy images respectively disposed on the display units of the two cabinets simultaneously.

In the vehicle-mounted display apparatus in accordance with embodiment 2 including the cabinet 10 provided with the display unit 2, and the supporting base 9 which is a member combined with this cabinet 10 and which is secured to a vehicle body, a plurality of convex portions 140 with rotational symmetry are disposed in the axial member 120 disposed in the cabinet 10, and a plurality of concave portions 38 with rotational symmetry are disposed in the inner periphery of the fitting hole 920 formed in the supporting base 90 into which the axial member 120 can be fitted, as an attitude setting mechanical unit for, when combining the cabinet 10 and the supporting base 9, determining the rotational attitude of one of them with respect to the other one for each of a plurality of positions.

In this structure, when the axial members 120 are fitted into the fitting holes 920 in order to combine the cabinet 10 with the supporting base 90, the plurality of convex portions 140 are engaged with the plurality of concave portions 38, respectively, so that the rotational attitude of the cabinet 10 can be determined with respect to the supporting base 90. Since the plurality of convex portions 140 are disposed so as to be rotational symmetric and the plurality of concave portions 38 are disposed so as to be rotational symmetric, the rotational attitude of the cabinet 10 can be determined for each of two or more positions.

The vehicle-mounted display has a mounting and demounting mechanical unit for combining the cabinet 10 with the supporting base 90 so that the cabinet 10 can be mounted to and demounted from the supporting base 90. This mounting and demounting mechanical unit includes the axial member 120 disposed in the cabinet 10, and the fitting hole 920 formed in the supporting base 90. Using the mounting and demounting mechanical unit which utilizes the fitting relationship between the axial member 120 and the fitting hole 920, the cabinet 10 can be simply combined with one of a plurality of supporting bases 90-1, 90-2, and 90-3 disposed at different positions, and the combination of the cabinet 10 with one of the plurality of supporting bases can be cancelled to change the position of the cabinet. Since the axial member 120 and the fitting hole 920 have the mounting and demounting mechanical unit and attitude setting mechanical unit in common, the structure of the vehicle-mounted display apparatus can be simplified.

Since the vehicle-mounted display apparatus in accordance with this embodiment 2 has, as a reciprocating means for supporting each of the plurality of convex portions 140 (140a) so that it can reciprocate, the container 141 (141a), spring 142 (142a), and stopping member 143 (143a) for restricting movements of each of the plurality of convex portions 140 (140a), the vehicle-mounted display apparatus provides a click mechanism in combination with the plurality of concave portions 38 to enable the user to easily select one rotational position from among a plurality of possible rotational positions to determine the rotational attitude of the display unit 2. Since the end part of each of the plurality of convex portions 140 or 140a is spherical in shape, the axial member 120 can be smoothly fitted into the fitting hole 920.

As shown in FIG. 13, since the cabinet 10 has two or more attaching members to each of which the axial member 120 can be attached, such as the attaching members 101 and 102, various types of mounting of the cabinet to the supporting base, as explained with reference to FIG. 24, can be implemented. When the vehicle-mounted display apparatus is so constructed as to include one or more cabinets 10 and two or more supporting bases 90-1, 90-2, 90-3, . . . , like that of embodiment 1, the smaller number of cabinets can be ordered around at different positions and at different times.

As previously explained, the axial member 120 is disposed in the cabinet 10 and the plurality of convex portions 140 with rotational symmetry are formed in the outer surface of this axial member 120, and the fitting hole 920 into which the axial member 120 can be fitted is formed in the supporting base 90 and the plurality of concave portions 38 which can be respectively engaged with the plurality of convex portions 140 are formed in the inner surface of this fitting hole 920 so that the plurality of concave portions are rotational symmetric. In contrast to this structure, an axial member 120 is disposed in the supporting base 90 and a plurality of convex portions 140 with rotational symmetry are formed in the outer surface of this axial member 120, and a fitting hole 920 into which the axial member 120 can be fitted is formed in the cabinet 10 and a plurality of concave portions 38 which can be respectively engaged with the plurality of convex portions 140 are formed in the inner surface of this fitting hole 920 so that the plurality of concave portions are rotational symmetric. In this case, since only the fitting hole is formed in the cabinet and no axial member protrudes from the cabinet, the cabinet is convenient to handle.

In embodiments 1 and 2, the supporting base 9 or 90 can also be installed on the pillar of a door, an arm rest, or the like. In accordance with embodiment 2, since the axial member 120 can be attached to and detached from the cabinet 10, and the cabinet 10 is a simple rectangular parallelepiped in shape when the axial member 120 is detached from the cabinet 10, various kinds of usage of the cabinet, such as mounting of the cabinet to an instrument panel or carrying out of the cabinet to outside the cabin for use of the cabinet, can be also implemented.

In a case where the vehicle-mounted display apparatus includes a plurality of cabinets, when a rechargeable type of battery is used as a power supply of the display unit 2 of each of the plurality of cabinets, and wireless, such as infrared radiation or an RF signal, is used as a signal transmitting means of the display unit 2, or a bus system is used to minimize the wire connecting the display units of the plurality of cabinets with one another, the user can display and use various kinds of information on the display units of the plurality of cabinets respectively mounted to a plurality of supporting base disposed at different positions of the vehicle.

Embodiment 3

A vehicle-mounted display apparatus in accordance with embodiment 3 of the present invention will be now described. In above-mentioned embodiments 1 and 2, the cabinet 1 to which the display unit 2 is mounted can be mounted to and demounted from one of different positions. In contrast, in accordance with this embodiment 3, the display unit 2 can be mounted to and demounted from the above-mentioned cabinet 1.

The vehicle-mounted display apparatus in accordance with this embodiment 3 enables mounting and demounting of the display unit 2 to and from the cabinet 1 using a mechanism (i.e., a second mounting and demounting mechanical unit) similar to the mounting and demounting mechanism (i.e., the first mounting and demounting mechanical unit) for mounting or demounting the cabinet 1 to and from one of a plurality of supporting bases 9 arranged at different positions. An accommodating recess 114 for accommodating the display unit 2 is formed in a surface of the cabinet 1, and two axial members 181 and 191 are disposed in two opposing wall surfaces of the accommodating recess 114 so as to protrude from and retract into the two opposing wall surfaces, respectively.

First, the cabinet 1 in which the display unit 2 is disposed so that it can be mounted to and demounted from the cabinet will be explained. As explained in embodiments 1 and 2, in FIG. 26, the cabinet 1 is formed of a rectangle block made of resin or metal, and a rectangular penetrating opening 11 is formed in an end portion of the cabinet 1 which is formed of a rectangle block. Two protruding portions 12 and 13 are formed opposite to each other at an interval in another end portion of the cabinet which is opposite to the end portion of the cabinet in which the opening 11 is formed. The accommodating recess 114 in which the display unit 2 in the shape of a rectangular parallelepiped, which consists of a liquid crystal display panel or the like, is placed so that the display unit can be mounted to and demounted from the cabinet is formed between the protruding portions 12 and 13 and the opening 11.

As explained in embodiments 1 and 2, axial members 121 and 131 which are shaped like a regular polygonal prism are formed face to face in the protruding portions 12 and 13, respectively, so that the axis line of each of the axial members matches with an identical axis 01-01, and are slidably supported by the protruding portions 12 and 13, respectively, so that they can move closer to each other and move away from each other along the same axis line 01-01. The axial members 181 and 191 are also supported by a mechanism which is similar to the mechanism for supporting the axial members 121 and 131 in the accommodating recess 114 so that the axial members 181 and 191 can protrude from and retract into the two opposing wall surfaces of the accommodating recess.

Figure 27:
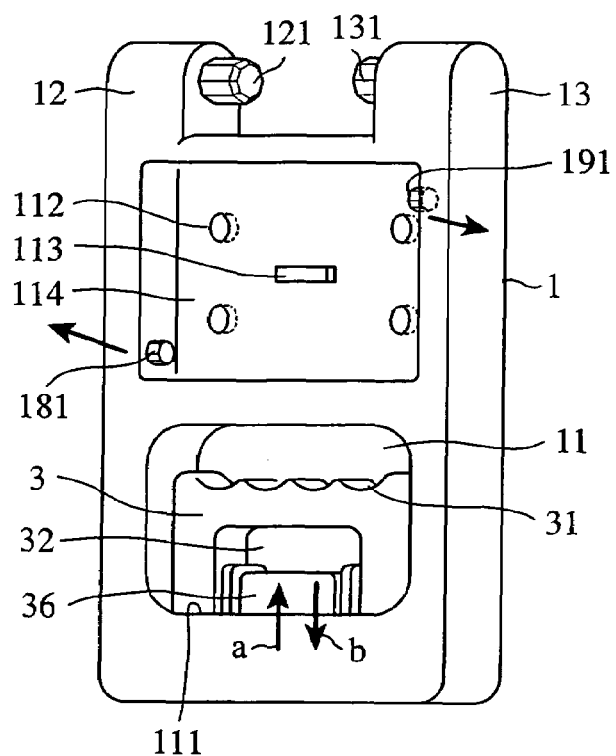
FIG. 27 is an outward appearance perspective view of the cabinet from which the display unit is demounted.

An operating member (i.e., a first operating mechanical unit) 3 is slidably disposed in an inner surface portion 111 of the opening 11 which is formed in the shape of a rectangle and which is large enough to contain one hand. The operating member 3 can slide closer to the two protruding portions 12 and 13 as shown by an arrow a, and can slide away from the two protruding portions 12 and 13 as shown by an arrow b (see FIG. 2). A rectangular penetrating opening 32 is formed in this operating member 3. This opening 32 is formed in the shape of a rectangle and is large enough to contain the user's fingertips, and another operating member (i.e., a second operating mechanical unit) 36 is slidably disposed in this opening. This operating member 36 can be manipulated in directions of arrows by using a mechanism which is similar to the mechanism for moving the operating member 3 as explained in embodiments 1 and 2, as shown in FIG. 27.

Figure 26:
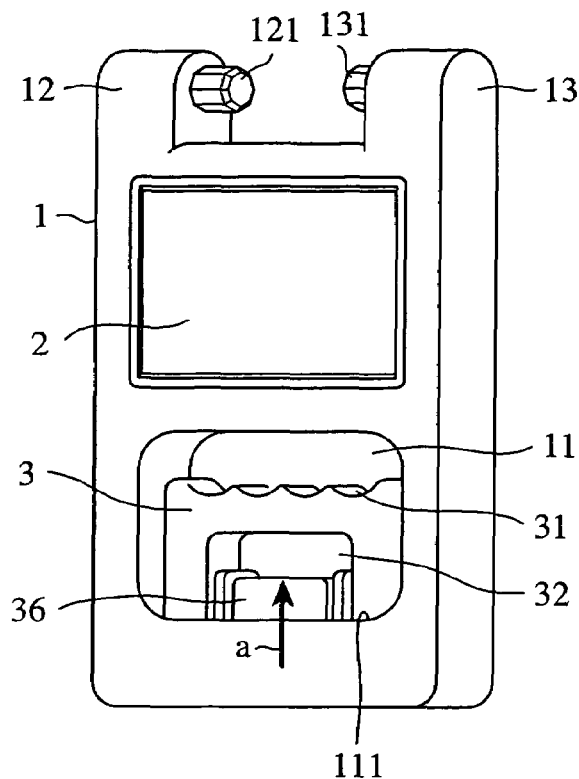
FIG. 26 is an outward appearance perspective view of a cabinet in which a display unit is disposed so that it can be mounted and demounted to and from the cabinet.

The operating member 36 is pressed toward a direction of the arrow a by a pressing means (i.e., a spring 83) which will be mentioned later. The user can push down on the operating member 36 into the cabinet 1 against the pressing force by the pressing means by touching the operating member 36 with the user's finger to apply a pressure to it. When the user weakens the force via the user's fingertips, the operating member 36 returns to its protrusion position as shown in FIG. 26 according to the pressing force by the pressing means.

Next, the structure of a movement transferring means for transferring a movement of the above-mentioned operating member 3 to the above-mentioned axial members 121 and 131, and that of another movement transferring means for transferring a movement of the above-mentioned operating member 36 to the above-mentioned axial members 181 and 191 will be explained with reference to FIG. 30. Peripheral components intended for the axial members 181 and 191 have the same structure as peripheral components intended for the axial members 121 and 131. The structure of peripheral components intended for the axial member 121 and that of peripheral components used for the axial member 131 are bilateral symmetric, and the structure of peripheral components intended for the axial member 181 and that of peripheral components intended for the axial member 191 are bilateral symmetric. Only the structure of peripheral components intended for the axial member 131 and that of peripheral components intended for the axial member 191 are shown in the figure.

Figure 30:
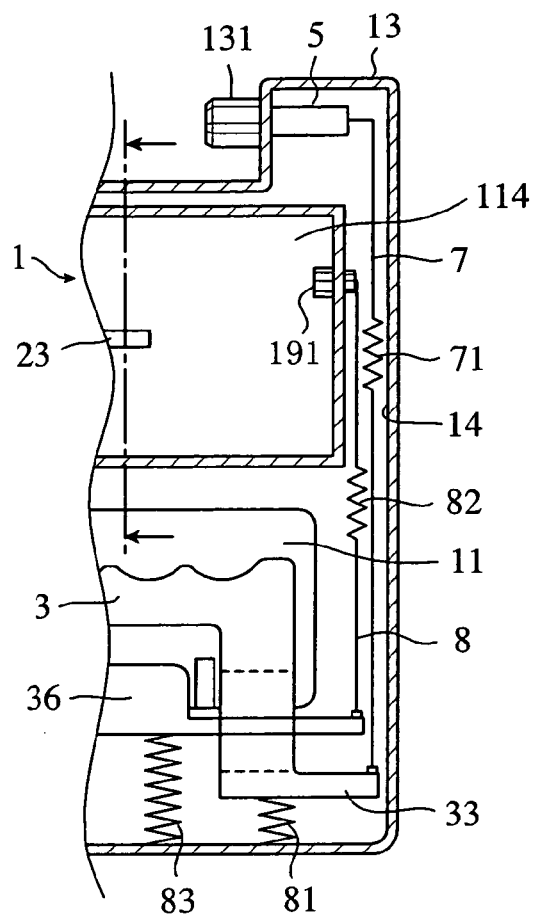
FIG. 30 is a longitudinal sectional view of a right half of the cabinet.
Figure 31:
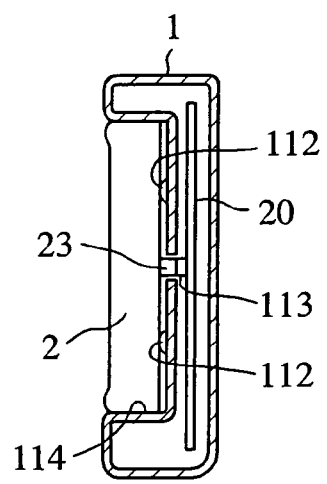
FIG. 31 is a transverse sectional view of the cabinet.
Figure 32:
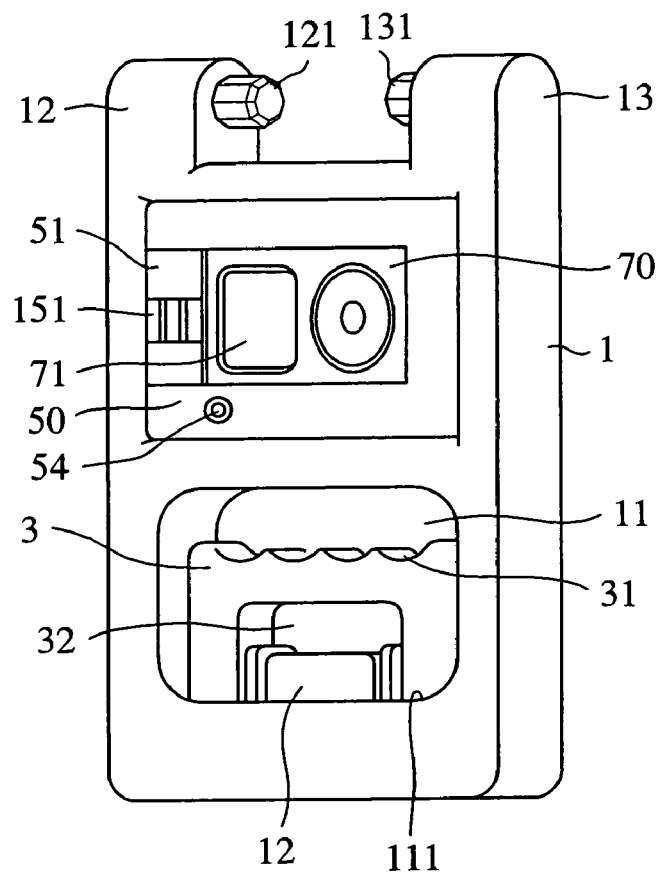
FIG. 32 is an outward appearance perspective view of the cabinet provided with a cartridge which is compatible with the display unit.

In FIG. 30, the axial member 191 is pressed toward the inner side (i.e., toward a leftward direction in the figure) of the accommodating recess 114 into which the display unit 2 can be accommodated by a pressing means (since this pressing means has the same structure as the pressing means intended for the axial member 131, it is not shown in the figure). Movements of the axial member 191 caused by the pressing are restricted by a mechanism similar to the mechanism for restricting movements of the axial member 131.

An end of a wire rod 8 is fixed to the axial body 191, and the other end of this wire rod 8 is fixed to the operating member 36 via an elastic spring 82 which is disposed, as an elastic member for absorbing the looseness of the wire rod, in the middle of the wire rod. In order to enhance returning movements of the operating member 36, an extensible spring 83 is placed between the operating member 36 and the cabinet 1, as shown in FIG. 30.

Figure 28:
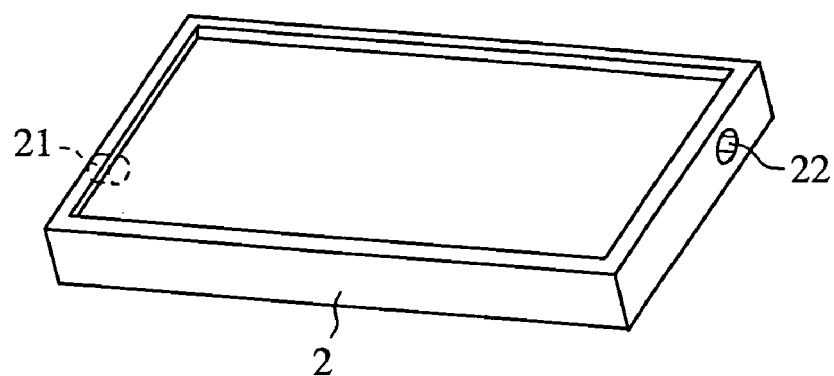
FIG. 28 is an outward appearance perspective view of the display unit.
Figure 29:
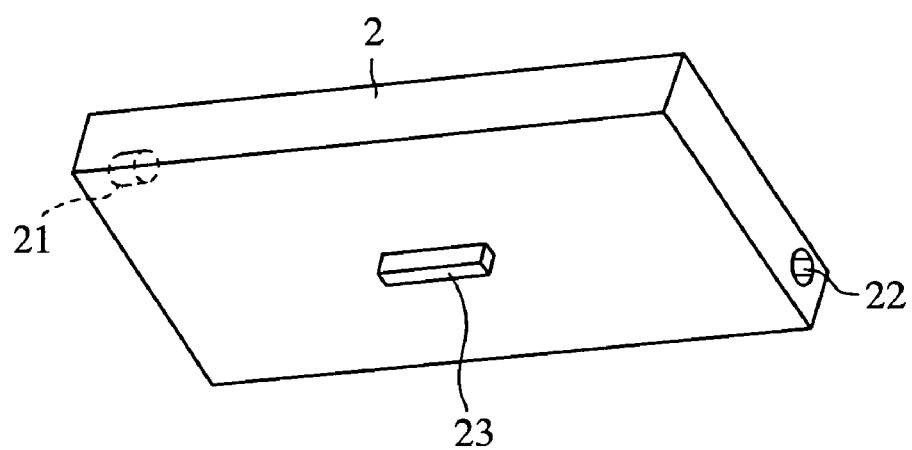
FIG. 29 is an outward appearance perspective view showing a back face of the display unit.

Next, the display unit 2 which is mounted to or demounted from the accommodating recess 114 of the cabinet 1 will be explained. As shown in FIGS. 28 and 29, the display unit 2 is formed in the shape of a thin long block, and a connector 23 which can be connected to a connector 113 formed in a central portion of the bottom of the accommodating recess 114 is disposed in a central portion of a rear surface of the display unit 2. Fitting holes 21 and 22 into and from which the axial bodies 181 and 191 can be fitted and removed are disposed in lateral surfaces of the display unit 2, respectively. On the other hand, hemispherical protruding portions 112 are disposed in the bottom of the accommodating recess 114 so as to always protrude because of an elastic force.

Next, mounting and demounting of the display unit 2 to and from the cabinet 1 will be explained.

When the user touches the operating member 36 of the cabinet 1 shown in FIG. 26 with the user's fingertips so as to push down on the operating member toward the inner surface portion 111 of the opening, the axial bodies 181 and 191 are retracted into the cabinet 1 by way of the wire rod 8 and spring 82. When the user then inserts the display unit 2 into the accommodating recess 114 while keeping the retracting state so that the axial members 181 and 191 are opposite to the fitting holes 21 and 22, respectively, and loosens the force for pushing down on the operating member 36, the axial bodies 181 and 191 whose free ends are beveled are fitted into the fitting holes 21 and 22 of the display unit 2, respectively, as the axial bodies 181 and 191 are pushed out toward the accommodating recess 114 by the pressing force of the pressing means which is not shown in FIG. 30. The fitting state is thus provided. In this way, the user can mount the display unit 2 to the accommodating recess 114 of the cabinet 1.

In the state in which the display unit is mounted to the accommodating recess, the hemispherical protruding portions 112 which are disposed in the bottom of the accommodation recess 114 so as to always protrude because of an elastic force are brought into contact with the rear surface of the display unit 2, and therefore the display unit 2 is always pressed by the protruding portions 112 toward a direction in which the display unit 2 is demounted from the accommodation recess 114. For this reason, the fitting holes 21 and 22 of the display unit 2 are pressed against the axial members 181 and 191, respectively, so that the display unit 2 can be certainly secured without rattling. When the user removes the axial bodies 181 and 191 from the fitting holes 21 and 22 by pushing down on the operating member, he or she can easily remove the display unit 2 from the cabinet since the protruding portions 112 pushes the display unit 2 out of the accommodating recess 114.

When desiring to change the rotational attitude of the cabinet 1 after mounting the display unit 2 to the cabinet 1, the user has only to manipulate the operating member 3 to temporarily remove the axial members 121 and 131 from the fitting holes 91 and 92, respectively, to tilt the regular-octagonal-prism-shaped axial members 121 and 131 by a desired number of angular steps with respect to the fitting holes 91 and 92 so as to tilt the cabinet by a desired angle, and to fit the axial members 121 and 131 into the fitting holes 91 and 92 again, respectively. When the fitting portions are formed in the shape of a regular octagonal prism, the rotational attitude of the display unit 2 can be adjusted in angular steps of 45 degrees. The fitting portions can be formed in the shape of an arbitrary regular polygonal prism. As the number of lateral side surfaces of each of the two regular-polygonal-prism-shaped axial members increases, the rotational attitude of the display unit can be adjusted in steps of a smaller angle.

In this embodiment 3 explained above, the display unit 2 is incorporated into the cabinet 1 so that the display unit can be mounted to and demounted from the cabinet 1. Therefore, the display unit 2 can be demounted from the cabinet 1 and can be connected with and used by another device. In addition, the user can protect the display unit 2 from theft or the like beforehand by demounting it from the cabinet and carrying it indoors.

Embodiment 4

In the vehicle-mounted display apparatus in accordance with embodiment 3, the display unit 2 can be mounted to and demounted from the accommodating recess 114 of the cabinet 1. In contrast, in a vehicle-mounted display apparatus in accordance with embodiment 4, a cartridge 50 having the same outward appearance as a display unit 2 and having compatibility with the display unit 2 can be mounted to and demounted from the cabinet 1 (a third mounting and demounting mechanical unit), and a sound source device 70 having a display, such as a small-sized sound device, can be mounted to the cabinet 1 by virtue of this cartridge 50.

Figure 33:
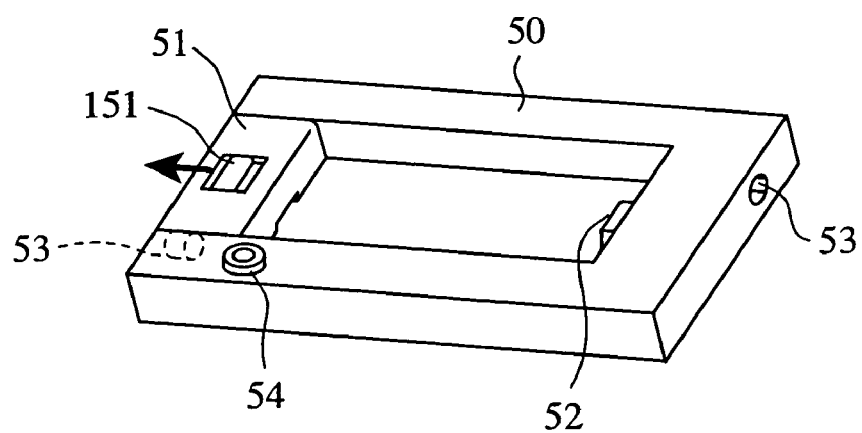
FIG. 33 is an outward appearance perspective view of the cartridge.
Figure 34:
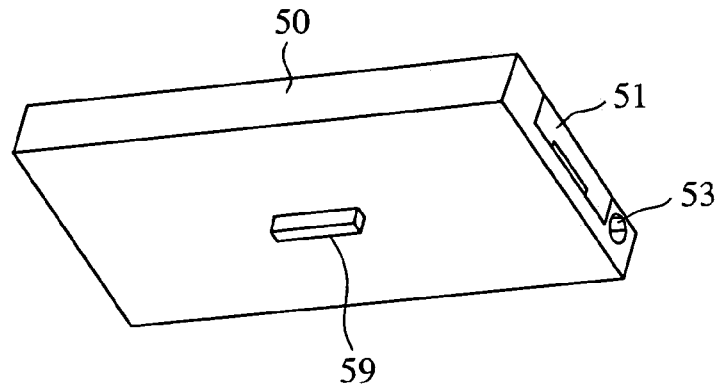
FIG. 34 is an outward appearance perspective view showing a back face of the cartridge.
Figure 35:
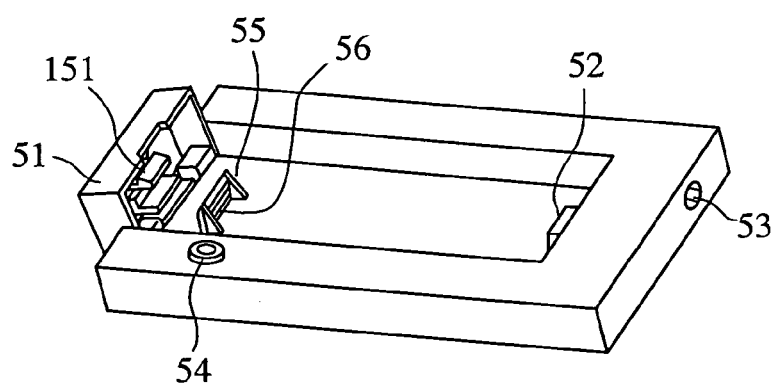
FIG. 35 is an outward appearance perspective view showing a state in which an opening and closing member used for the cartridge is open.
Figure 36:
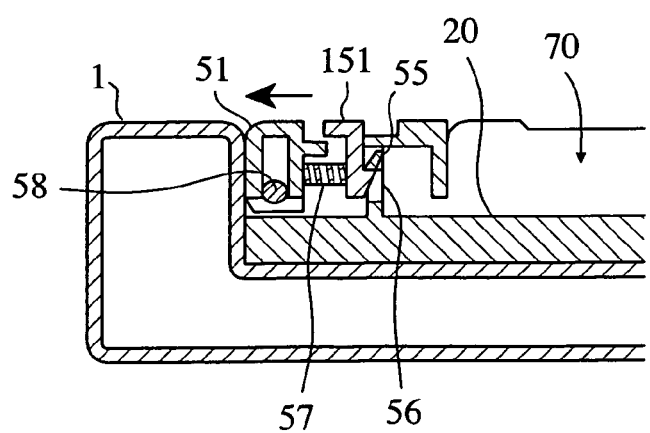
FIG. 36 is a longitudinal sectional view showing a state where the opening and closing member used for the cartridge is closed.

Since the mechanism for mounting and demounting the cartridge 50 to and from the cabinet 1 is the same as that of embodiment 3 for mounting and demounting the display unit 2 to and from the cabinet 1, the explanation of the mechanism will be omitted hereafter. As shown in FIG. 34, a connector 59 is disposed in a central portion of a rear surface of this cartridge 50, and this connector 59 is connected to a connector 113 (see FIG. 27) which is disposed on a wiring board 20 of the cabinet 1 and which is exposed to the accommodating recess from a hole formed in the bottom of the accommodating recess 114. A connector 52 to which a connector of the sound source device 70 is connected is disposed on one of two opposing surfaces of the accommodating recess of the cartridge 50. As shown in FIGS. 33, 35, and 36, an opening and closing member (i.e., a third operating mechanical unit) 51 having a hinge structure is disposed on the other one of the two opposing surfaces of the accommodating recess.

This opening and closing member 51 has an end portion which is secured to a hinge shaft 58 so that it can be opened and closed, and this hinge shaft 58 is pivotally supported by the cartridge 50. The opening and closing member 51 has an engaging hook 151 in a central portion of a surface thereof. An engaging member 55 is standing on the bottom of the accommodating recess of the cartridge 50, and the engaging hook 151 can be made to be engaged with an engaging hole 56 of this engaging member 55.

Next, attachment of the sound source device 70 to the cartridge 50 will be explained. First, the user moves the engaging hook 151 toward a direction of an arrow of FIG. 33 against a pressing means (i.e., a spring) 57 with the user's fingertips so as to remove the engagement of the engaging hook 151 with the engaging hole 56. The user then rotates the opening and closing member 51 around the hinge shaft 58 so as to open the opening and closing member 51, as shown in FIG. 35. While the opening and closing member 51 is in this open state, the user slides the sound source device 70 into the cartridge 50 from the side of the opening and closing member, and then connects the connector (not shown) of the sound source device 70 to the receptacle 52 of the cartridge 50. When the user then rotates the opening and closing member 51 around the hinge shaft 58 so as to close the opening and closing member, as shown in FIG. 36, the engaging hook 151 is engaged with the engaging hole 56 so that the closing state is held, and the sound source device 70 is pressed by the front of the closed opening and closing member 51 toward the receptacle thereof. As a result, the mechanical holding of the cartridge is strengthened, and the electrical connection between the cartridge and the sound source device can be held with stability.

As mentioned above, since the vehicle-mounted display apparatus in accordance with embodiment 4 is so constructed that the cartridge having compatibility with the display unit 2 which can be mounted to and demounted from the cabinet 1 can be mounted to the cabinet 1, the sound source device 70 having a display, such as a small-sized sound device, can be mounted, by way of this cartridge 50, to the cabinet 1. As a result, since the connector of the sound source device 70 can be connected to the connector 52 disposed in the cartridge, a sound generated by the sound source device 70 can be output from a vehicle-mounted speaker. The user can also hear the sound using earphones by inserting the connector of the earphones into an earphone jack 54 disposed in the cartridge 50. When leaving from the vehicle, the user can demount the sound source device 70 from the cartridge 50 to carry the sound source device by following the mounting steps in reverse. Therefore, the user can protect the sound source device from theft or the like beforehand.

INDUSTRIAL APPLICABILITY

As mentioned above, the vehicle-mounted display apparatus in accordance with the present invention enables users to use the display unit thereof at different times and at different positions with simple manipulations of the vehicle-mounted display apparatus, enables the display unit thereof to be demounted from the cabinet, and enables the sound source device to be mounted the cartridge having compatibility with the display unit, and is suitable for use in vehicles.

The invention claimed is:

1. A selectively mountable display apparatus suitable for mounting on a supporting base attached to a surface, said apparatus comprising:

a cabinet containing a media presentation device, said cabinet being separate from said supporting base such that said cabinet must be combined with said supporting base in order to mount said apparatus to said surface, said cabinet having a plurality of attaching portions, to any of which said axial member is attached, at a plurality of positions thereof;

a mounting device disposed in said cabinet for combining said cabinet with said supporting base, said mounting device comprising an axial member disposed in said cabinet such that said cabinet may be mounted at a plurality of rotational orientations with respect to said supporting base, using said axial member as an axis of rotation; and an operating mechanical unit disposed in said cabinet for establishing or cancelling the combination of said cabinet and said base wherein said operating mechanical unit connects said cabinet to said base using said axial member by inserting or retracting a protruding portion of said axial member disposed in said cabinet to and from said base such that said protruding portion is inserted into said base along the same line where said axial member is disposed, and such that the connection of said protruding member and said base facilitates rotation of said cabinet with respect to said base about said axial member.

2. A selectively mountable display apparatus suitable for mounting on a supporting base attached to a surface, said apparatus comprising:

a cabinet containing a media presentation device, said cabinet being separate from said supporting base such that said cabinet must be combined with said supporting base in order to mount said apparatus to said surface;

a mounting device disposed in said cabinet for combining said cabinet with said supporting base, said mounting device comprising an axial member disposed in said cabinet such that said cabinet may be mounted at a plurality of rotational orientations with respect to said supporting base, using said axial member as an axis of rotation; and an operating mechanical unit disposed in said cabinet for establishing or cancelling the combination of said cabinet and said base wherein said operating mechanical unit connects said cabinet to said base using said axial member by inserting or retracting a protruding portion of said axial member disposed in said cabinet to and from said base such that said protruding portion is inserted into said base along the same line where said axial member is disposed, and such that the connection of said protruding member and said base facilitates rotation of said cabinet with respect to said base about said axial member, wherein said display apparatus comprises a plurality of cabinets, each of which is said cabinet.

3. A selectively mountable display apparatus suitable for mounting on a supporting base attached to a surface, said apparatus comprising:

a cabinet containing a media presentation device, said cabinet being separate from said supporting base such that said cabinet must be combined with said supporting base in order to mount said apparatus to said surface;

a mounting device disposed in said cabinet for combining said cabinet with said supporting base, said mounting device comprising an axial member disposed in said cabinet such that said cabinet may be mounted at a plurality of rotational orientations with respect to said supporting base, using said axial member as an axis of rotation; and an operating mechanical unit disposed in said cabinet for establishing or cancelling the combination of said cabinet and said base wherein said operating mechanical unit connects said cabinet to said base using said axial member by inserting or retracting a protruding portion of said axial member disposed in said cabinet to and from said base such that said protruding portion is inserted into said base along the same line where said axial member is disposed, and such that the connection of said protruding member and said base facilitates rotation of said cabinet with respect to said base about said axial member; and an attitude setting unit disposed in said cabinet for, when said cabinet is combined with said base, allowing for the determination of a rotational attitude of said cabinet with respect to said base for a plurality of positions such that a plurality of fixed positions are set within the rotational range of said cabinet with respect to said base wherein said cabinet may be mounted to said base in any of said fixed positions and may be rotated between said fixed positions while mounted to said base, said attitude setting mechanical unit further comprising a retractable convex portion protruding from the outer surface of said axial member.

4. The selectively mountable display apparatus of claim 3, said convex portion being spherical in shape.

5. A selectively mountable display apparatus suitable for mounting on a supporting base attached to a surface, said apparatus comprising:

a cabinet containing a media presentation device, said cabinet being separate from said supporting base such that said cabinet must be combined with said supporting base in order to mount said apparatus to said surface;

a mounting device disposed in said cabinet for combining said cabinet with said supporting base, said mounting device comprising an axial member disposed in said cabinet such that said cabinet may be mounted at a plurality of rotational orientations with respect to said supporting base, using said axial member as an axis of rotation; and an operating mechanical unit disposed in said cabinet for establishing or cancelling the combination of said cabinet and said base wherein said operating mechanical unit connects said cabinet to said base using said axial member by inserting or retracting a protruding portion of said axial member disposed in said cabinet to and from said base such that said protruding portion is inserted into said base along the same line where said axial member is disposed, and such that the connection of said protruding member and said base facilitates rotation of said cabinet with respect to said base about said axial member; and an attitude setting unit disposed in said cabinet for, when said cabinet is combined with said base, allowing for the determination of a rotational attitude of said cabinet with respect to said base for a plurality of positions such that a plurality of fixed positions are set within the rotational range of said cabinet with respect to said base wherein said cabinet may be mounted to said base in any of said fixed positions and may be rotated between said fixed positions while mounted to said base, said attitude setting mechanical unit further comprising a retractable convex portion protruding from the outer surface of said axial member and a pressing and holding device that causes said convex portion to retract into said axial member when said pressing and holding device is pressed and remain in either a protruding or a retracted state when the holding aspect of said pressing and holding device is engaged.

6. The selectively mountable display apparatus of claim 5, said pressing and holding device further comprising a container for accommodating said convex portion so that the convex member can protrude from and retract into said axial member, an elastic member for pressing said convex portion into a protruding state, and a stopping member for restricting movements of said convex portion which are caused by this elastic member.

7. A method for selectively mounting and de-mounting a display apparatus to a surface having a mounting base disposed thereon, said method comprising:

coupling a cabinet having a cavity that contains a display media presentation device to said mounting base using retractable axial members disposed on inside surfaces of protruding portions of said cabinet such that said axial members have a cross-sectional shape that corresponds to fitting holes disposed in said base, and wherein said axial members may be selectively retracted into or projected from said protruding portions of said cabinet with an axial member actuation device disposed within said cabinet and further wherein said axial members are disposed along an axial line and enable said cabinet to be rotatably mounted to said base, with said axial line comprising the axis of rotation; and rotating said cabinet by disengaging an attitude-setting unit disposed in said cabinet, rotating said cabinet to a new orientation while said cabinet is still coupled to said base, and re-engaging said attitude-setting unit to hold said cabinet in the newly selected rotational orientation.

* * * * *